United States Patent
Cairns et al.

(10) Patent No.: US 8,144,749 B2
(45) Date of Patent: Mar. 27, 2012

(54) NONPARAMETRIC MIMO G-RAKE RECEIVER

(75) Inventors: Douglas A. Cairns, Durham, NC (US); Elias Jonsson, Malmö (SE); Anders Rosenqvist, Södra Sandby (SE); Andres Reial, Malmö (SE); Stephen Grant, Cary, NC (US)

(73) Assignee: Telefonaktiebolaget L M Ericsson, Stockholm (SE)

( * ) Notice: Subject to any disclaimer, the term of this patent is extended or adjusted under 35 U.S.C. 154(b) by 882 days.

(21) Appl. No.: 12/198,973

(22) Filed: Aug. 27, 2008

(65) Prior Publication Data

US 2010/0054309 A1 Mar. 4, 2010

(51) Int. Cl.
*H04B 1/707* (2006.01)
*H04L 1/06* (2006.01)

(52) U.S. Cl. ........................................ 375/147; 375/267

(58) Field of Classification Search .................. 375/144, 375/147, 148, 260, 262, 265, 276, 347; 370/208, 370/210, 335, 342
See application file for complete search history.

(56) References Cited

U.S. PATENT DOCUMENTS

| 6,363,104 | B1 | 3/2002 | Bottomley | |
|---|---|---|---|---|
| 2005/0195889 | A1* | 9/2005 | Grant et al. | 375/148 |
| 2005/0201447 | A1 | 9/2005 | Cairns et al. | |
| 2006/0251156 | A1* | 11/2006 | Grant et al. | 375/148 |
| 2006/0256843 | A1* | 11/2006 | Grant et al. | 375/148 |
| 2008/0152053 | A1 | 6/2008 | Fulghum | |
| 2009/0149147 | A1* | 6/2009 | Jonsson et al. | 455/296 |
| 2009/0213909 | A1 | 8/2009 | Grant et al. | |
| 2009/0213910 | A1 | 8/2009 | Grant et al. | |

FOREIGN PATENT DOCUMENTS

WO  WO 2007/115581 A1  10/2007

* cited by examiner

*Primary Examiner* — Young T. Tse

(57) ABSTRACT

With a nonparametric G-Rake receiver, combining weights may be determined using a nonparametric mechanism in multiple-input, multiple-output (MIMO) scenarios. In an example embodiment, a method for a receiving device having a nonparametric G-Rake receiver entails calculating an impairment covariance matrix and determining combining weights. More specifically, the impairment covariance matrix is calculated based on a pilot channel using a nonparametric mechanism in a MIMO scenario in which a code-reuse interference term exists. The combining weights are determined for the nonparametric G-Rake receiver responsive to the impairment covariance matrix and by accounting for the code-reuse interference term.

26 Claims, 10 Drawing Sheets

NONPARAMETRIC MIMO G-RAKE RECEIVER

TECHNICAL FIELD

The present invention relates generally to implementing G-Rake receivers in communications systems, including ones that are capable of operating in multiple input, multiple output (MIMO) scenarios.

BACKGROUND

Many specialized terms and abbreviations are used in the communications arts. At least some of the following are referred to within the text that follows, such as in this background and/or the description sections. Thus, the following terms and abbreviations are herewith defined:

| | |
|---|---|
| 3GPP | 3rd Generation Partnership Project |
| CDMA | Code Division Multiple Access |
| CL1 | Closed Loop mode 1 |
| CQI | Channel Quality Indicator |
| D-TxAA | Dual Transmit Adaptive Array |
| G-Rake | Generalized Rake |
| MIMO | Multiple Input, Multiple Output |
| MISO | Multiple Input, Single Output |
| ML | Maximum Likelihood |
| MMSE | Minimum Mean Squared Error |
| MS | Mobile Station |
| RBS | Radio Base Station |
| SIMO | Single Input, Multiple Output |
| SINR | Signal-to-Interference-plus-Noise Ratio |
| SISO | Single Input, Single Output |
| SNR | Signal-to-Noise Ratio |
| STTD | Space Time Transmit Diversity |
| TTI | Transmission Time Interval |
| WCDMA | Wideband CDMA |
| ZF | Zero Forcing |

Electronic communication forms the backbone of today's information-oriented society. Electronic communications are transmitted over wireless or wired channels using electromagnetic radiation. The availability and capacity of electronic communications is typically limited by the bandwidth of the communications channel. Especially in wireless environments, the bandwidth of a communications channel may be limited by the finite nature of the electromagnetic spectrum.

The available bandwidth of a communications channel, even given a finite allocation of the electromagnetic spectrum, may be increased by adopting any of a number of different schemes. These schemes enable more information to be communicated in a given spectrum allocation. Efficient utilization of spectrum can reduce the cost of communication services being provided, can enable richer communication services to be provided, or both.

Example schemes include compression of the information, dense symbol modulations, error correction encoding, utilizing multipath signal diversity, adopting multiple antennas at the transmitter and/or receiver, directing transmissions and/or receptions with beamforming, and so forth. Many of these schemes may be combined into the same communication system and used together to further increase the efficient utilization of spectrum.

For example, a Rake receiver can collect signal energy from diverse signals to strengthen reception and demodulation of the actual information. A conventional Rake receiver can use multipath reception to improve the SNR of a received multipath signal by combining the paths with appropriate weights. The Rake receiver includes fingers that are placed on the diverse signal paths. Received traffic symbols from each signal path are despread for each finger in accordance with known spread spectrum technologies. The Rake receiver combines the despread traffic symbol values as received on the diverse paths into an estimated symbol using combining weights. The estimated symbols resulting from weighted combinations tend to have a lower error rate as compared to those resulting from single-path reception. However, the conventional Rake receiver does not address interference, which can result in degraded receiver performance.

In contrast, a Generalized Rake, or G-Rake, receiver can suppress interference. A G-Rake receiver may place fingers at other locations in addition to those for signal paths to enhance overall signal reception and symbol demodulation. More specifically, interference may be suppressed by using a set of combining weights that account for the effect of noise and interference to thereby improve the Signal-to-Interference-plus-Noise Ratio (SINR) of a received multipath signal. Both conventional Rake and G-Rake receivers may operate in SISO, SIMO, MISO, and MIMO scenarios.

With MIMO scenarios, multiple antennas are utilized at the transmitter and at the receiver. A MIMO communication scenario involves N transmit antennas and M receive antennas. The variables N and M are positive integers greater than one; they may be the same or different integers. The transmit and/or receive processing is designed in a manner so as to improve bit/block error rates as compared to communication scenarios that have a single transmit antenna and/or a single receive antenna.

A 2×2 MIMO scenario (e.g., a scenario with 2 transmit and 2 receive antennas) has been standardized within 3GPP. This 3GPP 2×2 MIMO scenario is based upon the so-called Dual-Transmit Adaptive Array (D-TxAA) concept. D-TxAA is an extension of a previously-standardized transmit diversity scheme known as Closed Loop mode 1 (CL 1). D-TxAA has two modes of operation: single stream mode and dual stream mode. In either mode, the transmitter operations are specified (e.g., those operations of an RBS in a WCDMA system). Although performance requirements for the receiver are specified, the specific operations for the receiver structure are not stipulated.

There are existing linear interference suppression approaches for MIMO. Two examples are reviewed below: the parametric G-Rake receiver and the MIMO chip equalizer. For parametric G-Rake linear interference suppression, such receivers operate on the symbol level. For a 2×2 MIMO scenario, this receiver computes an impairment covariance matrix $R_u$ via equation (1):

$$R_u = \alpha_1 R_{11} + \alpha_2 R_{22} + \alpha_{12}{}^+ R_{12}{}^+ + j\alpha_{12}{}^- R_{12}{}^- + \beta R_n, \qquad (1)$$

where $R_{11}$ captures the interference due to transmit antenna 1, $R_{22}$ captures the interference due to transmit antenna 2, $R_{12}{}^+$ and $R_{12}{}^-$ represent cross-antenna interference, and $R_n$ accounts for white noise passing through the receive filter.

The α and β weighting terms for this model-based parametric G-Rake receiver are given by equations (2):

$$\alpha_1 = \frac{1}{\gamma_p(1)N_p}\left[\Gamma_{D/P}(\gamma_s(1)|b_{11}|^2 + \gamma_s(2)|b_{12}|^2) + \Gamma_{V/P}\sum_{i=1}^{K_v}\gamma_v(i)|v_{1i}|^2 + \gamma_o(1)\Gamma_{O/P} + \gamma_p(1)\right]$$

$$\alpha_2 = \frac{1}{\gamma_p(2)N_p}\left[\Gamma_{D/P}(\gamma_s(1)|b_{21}|^2 + \gamma_s(2)|b_{22}|^2) + \Gamma_{V/P}\sum_{i=1}^{K_v}\gamma_v(i)|v_{2i}|^2 + \gamma_o(2)\Gamma_{O/P} + \gamma_p(2)\right]$$

$$\alpha_{12}^+ = \frac{1}{N_p\sqrt{\gamma_p(1)\gamma_p(2)}}\left[\Gamma_{D/P}(\gamma_s(1)\mathrm{Re}[b_{11}b_{21}^*] + \gamma_s(2)\mathrm{Re}[b_{12}b_{22}^*]) + \Gamma_{V/P}\sum_{i=1}^{K_v}\gamma_v(i)\mathrm{Re}[v_{1i}v_{2i}^*]\right]$$

$$\alpha_{12}^- = \frac{1}{N_p\sqrt{\gamma_p(1)\gamma_p(2)}}\left[\Gamma_{D/P}(\gamma_s(1)\mathrm{Im}[b_{11}b_{21}^*] + \gamma_s(2)\mathrm{Im}[b_{12}b_{22}^*]) + \Gamma_{V/P}\sum_{i=1}^{K_v}\gamma_v(i)\mathrm{Im}[v_{1i}v_{2i}^*]\right]$$

$$\beta = N_0.$$

Here, $N_p$ is the pilot code spreading factor; $\gamma_s(k)$ is the fraction of the total base station chip energy allocated to voice (x=v), data (x=s), overhead (x=o), or pilots (x=p) for antenna/stream k; $\Gamma_{x/P}$ is the ratio of chip energies $E_x/E_p$; $b_{ij}$ is the i,j element of pre-coding matrix B; and $v_{ij}$ is the $i^{th}$ element of the pre-coding vector v for the $j^{th}$ voice user. It should be noted that in WCDM, for example, the columns of B and the pre-coding vectors v are drawn from the codebook $\Phi=\{\phi_1,\phi_2,\phi_3,\phi_4\}$, where $\phi_k=[1\ e^{j(2k-1)\pi/4}]^T$. The columns of pre-coding matrix B are selected from orthogonal pairs of $\Phi$ in dual stream mode. In single stream mode, on the other hand, one pre-coding vector is chosen for the first column of B while the second column is set to the zero vector ($[0\ 0]^T$).

A G-Rake receiver utilizes an impairment covariance matrix $R_u$ and net channel estimates to compute combining weights w. The combining weights w for this receiver structure depend on whether one or two streams are being transmitted. For single stream mode, the combining weights $w^{single}$ are obtained by solving the following system of equations (3):

$$R_u w^{single} = h_{eff}(b), \quad (3)$$

where the notation $h_{eff}(b)$ indicates the "effective" net channel coefficients that depend on the pre-coding vector b. The pre-coding vector b is for the single stream mode and is the first column of pre-coding matrix B.

For dual stream mode, two sets of combining weights $(w_1^{dual}, w_2^{dual})$ are computed. These weights are obtained by solving the following systems of equations (4):

$$(R_u + \alpha_{PC}(2)h_{eff}(b_2)h_{eff}^H(b_2))w_1^{dual} = h_{eff}(b_1) \quad (4)$$
$$(R_u + \alpha_{PC}(1)h_{eff}(b_1)h_{eff}^H(b_1))w_2^{dual} = h_{eff}(b_2).$$

Here, the $h_{eff}(b_n)$ is the effective net channel coefficient vector due to pre-coding for stream n, and $\alpha_{PC}(n)$ is a per-code scaling factor that multiplies the outer product of the effective net channel coefficients to account for the fact that the same channelization codes are used for both streams (i.e., code reuse interference). The pre-coding vector $b_1$ corresponds to the first column of pre-coding matrix B, and the pre-coding vector $b_2$ corresponds to the second column of pre-coding matrix B.

With parametric G-Rake linear interference suppression, symbol estimates for either the single or the dual stream mode are obtained by computing the inner product of the combining weights for the given stream with the despread traffic symbol values. It should be noted that the G-Rake receiver described immediately above can be simplified to reduce its complexity. The reduced complexity version involves the estimation of fewer matrix terms and therefore fewer scaling parameters.

For MIMO chip equalizer linear interference suppression, such receivers are extensions of the chip equalizer proposed for interference suppression with multiple receive antennas (e.g., a so-called type 3 receiver) for the case of dual stream transmissions. The receiver description that follows is taken from a 3GPP working group document (RAN4, document number R4-061370, 2006). Chip equalizers employ a different sequence of operations than a G-Rake receiver. Generally, a G-Rake receiver first despreads the chip sequence across multiple respective fingers to produce respective despread symbol values and then combines the resulting despread values to form symbol estimates. In contrast, a chip equalizer essentially combines first and then despreads the signal with a single finger to form the symbol estimates.

With a MIMO chip equalizer, it is given that the chip level signal from stream 1 and stream 2 are $s_1$ and $s_2$, respectively. The received signal is represented by equation (5):

$$r = H\tilde{B}s + n \quad (5)$$

where $$s = \begin{bmatrix} s_1 \\ s_2 \end{bmatrix},$$

$$H = \begin{bmatrix} H_{1,1} & H_{1,2} \\ H_{2,1} & H_{2,2} \end{bmatrix},$$

and $$\tilde{B} = \begin{bmatrix} b_{11}I & b_{12}I \\ b_{21}I & b_{22}I \end{bmatrix}.$$

The signal $\tilde{B}s$ is the transmitted signal after pre-coding which propagates through the channel matrix H. The other cell noise is denoted by n, and it is assumed to be white and Gaussian. The assumption on transmissions by other users is that they are using the same beam coefficients as the user of interest. Of course, this creates a mismatch between the true transmission and the derived equalizer coefficients.

The channel matrix from transmit antenna j to receive antenna i models the channel convolution. Thus, the channel matrix H is represented by equations (6) and (7) as follows:

$$H_{i,j} = \begin{bmatrix} h_{N_s\times(F+L-1)}^{i,j} & 0_{N_s\times1} & \Lambda & 0_{N_s\times1} \\ 0_{N_s\times1} & h_{N_s\times(F+L-1)}^{i,j} & \Lambda & 0_{N_s\times1} \\ 0_{N_s\times1} & 0_{N_s\times1} & O & 0_{N_s\times1} \\ 0_{N_s\times1} & 0_{N_s\times1} & \Lambda & h_{N_s\times(F+L-1)}^{i,j} \end{bmatrix}, \quad (6)$$

with $$h_{N_s\times(F+L-1)}^{i,j} = \begin{bmatrix} h_{0,L-1}^{i,j} & \Lambda & h_{0,0}^{i,j} \\ M & O & M \\ h_{N_s-1,L-1}^{i,j} & \Lambda & h_{N_s-1,0}^{i,j} \end{bmatrix}. \quad (7)$$

Here, $N_s$ and L are the number of samples per chip and the length of the impulse response, respectively. If the equalizer length in chips equals F, the size of the channel matrix H equals $(2N_s,F) \times 2(F+L-1)$.

The equalizer filter coefficients are obtained by first constructing a matrix filter via equation (8):

$$w_{Rx} = \tilde{B}^H H^H (H\tilde{B}\tilde{B}^H H^H + 2\sigma_n^2 I) \qquad (8)$$
$$= \tilde{B}^H H^H (HH^H + 2\sigma_n^2 I).$$

An estimate of the chip pair $s_1(d)$ and $s_2(d)$ can be obtained from rows d and F+L−1+d of the matrix filter $w_{Rx}$. In other words, the chip pair can be estimated as shown in equation (9):

$$\begin{bmatrix} \tilde{s}_1(d) \\ \tilde{s}_2(d) \end{bmatrix} = \begin{bmatrix} w_{Rx}(d) \\ w_{Rx}(F+L-1+d) \end{bmatrix} r. \qquad (9)$$

With such MIMO chip equalizer linear interference suppression, the symbol estimates for the two streams are then obtained by despreading the resulting chip sequences.

Unfortunately, there are deficiencies in the foregoing state of the art for interference suppression with regard to both parametric G-Rake receivers and MIMO chip equalizers. With regard to the parametric G-Rake approach, performance at high SINR levels is problematic. The parametric formulation entails the knowledge of channel delays. At low to moderate SINR, errors in channel delay estimation generally do not affect receiver performance. At high SINR, on the other hand, highly accurate delay estimates are required, and even small errors in channel delay estimation effectively limit the peak throughput of the receiver. This peak throughput limitation can be relatively significant, especially when there is little or no channel coding (i.e., at high data rates). A limitation of peak throughput is considered a drawback to purchasers of communications systems and from a user experience point of view. Although the errors in channel delay estimation can be addressed, doing so involves considerable complexity and cost expenditures.

With regard to the MIMO chip equalizer approach, such a receiver generally performs worse than the inventive embodiments described herein below in terms of either throughput or block error rate. This is caused by the chip equalizer receiver making some explicit assumptions regarding the signals being transmitted by the base station (e.g., by an RBS). Deviations from these assumptions by the transmitted signals can result in poor overall receiver performance. Consequently, there is a need to address these deficiencies in the current state of the art. Such deficiencies and other needs are addressed by one or more of the various embodiments of the present invention.

SUMMARY

It is an object of the present invention to improve throughput and/or error rates for receivers in at least some situations for MIMO scenarios.

In an example embodiment, a method for a receiving device having a nonparametric G-Rake receiver entails calculating an impairment covariance matrix and determining combining weights. More specifically, the impairment covariance matrix is calculated based on a pilot channel using a nonparametric mechanism in a MIMO scenario in which a code-reuse interference term exists. The combining weights are determined for the nonparametric G-Rake receiver responsive to the impairment covariance matrix and by accounting for the code-reuse interference term.

In another example embodiment, a receiving device having a nonparametric G-Rake receiver includes an impairment covariance matrix calculator and a combining weights determiner. More specifically, the impairment covariance matrix calculator is to calculate an impairment covariance matrix based on a pilot channel using a nonparametric mechanism in a MIMO scenario in which a code-reuse interference term exists. The combining weights determiner is to determine combining weights for the nonparametric G-Rake receiver responsive to the impairment covariance matrix and by accounting for the code-reuse interference term.

An advantage of certain embodiment(s) of the present invention is that a nonparametric MIMO G-Rake receiver may determine an impairment covariance matrix without undue reliance on a strict model.

Another advantage of certain embodiment(s) of the present invention is that a nonparametric MIMO G-Rake receiver may perform relatively well at low to moderate receiver speeds.

Yet another advantage of certain embodiment(s) of the present invention is that a nonparametric MIMO G-Rake receiver may be relatively robust with respect to errors in determining channel delays. With a nonparametric MIMO G-Rake receiver formulation, such errors can be handled without significant additional processing.

Additional embodiments are described and/or claimed herein. Example additional embodiments include, by way of example but not limitation, arrangements, media, systems, and so forth. Additional aspects of the invention are set forth in part in the detailed description, drawings, and claims that follow, and in part may be derived from the detailed description and drawings, or can be learned by practice of the invention. It is to be understood that both the foregoing general description and the following detailed description are exemplary and explanatory only and are not restrictive of the invention as disclosed or as claimed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

Figure 1:
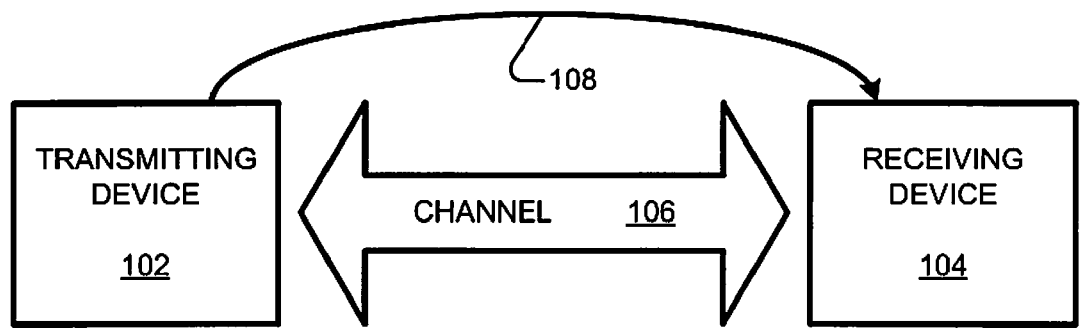
FIG. 1 is a block diagram of an example communications system including a transmitting device and a receiving device.

FIG. 1 is a block diagram of an example communications system 100 including a transmitting device 102 and a receiving device 104. As illustrated, communications system 100 includes a channel 106 and a signal 108 in addition to transmitting device 102 and receiving device 104. In operation, transmitting device 102 transmits a signal 108 over channel 106 to receiving device 104. Receiving device 104 receives signal 108 from transmitting device 102 via channel 106.

It should be understood that a single device may function as a transmitting device 102 at one moment and/or with respect to one communication and as a receiving device 104 at another moment and/or with respect to another communication. Examples of transmitting devices 102 and receiving devices 104 include, by way of example but not limitation, network communication nodes, remote terminals, and other devices that are capable of communicating over a channel 106. Network communication nodes may include, for example, a base transceiver station, a radio base station, a Node B, an access point, and so forth. Remote terminals may include, for example, a mobile terminal, a mobile station, a subscriber station, a communication card or module, and so forth. General example device implementations for transmitting/receiving devices 102/104 are described herein below with particular reference to FIG. 12.

Generally, channel 106 may be a wired channel or a wireless channel. Regardless, channel 106 affects the transmission, propagation, and/or reception of signal 108. When a Rake receiver, including a G-Rake receiver, is used at receiving device 104, estimates of channel properties and/or channel effects are made. These estimates aid in the recovery of the information that is carried by signal 108. Example general principles for a G-Rake receiver are described further herein below with particular reference to FIG. 5.

Figure 2:
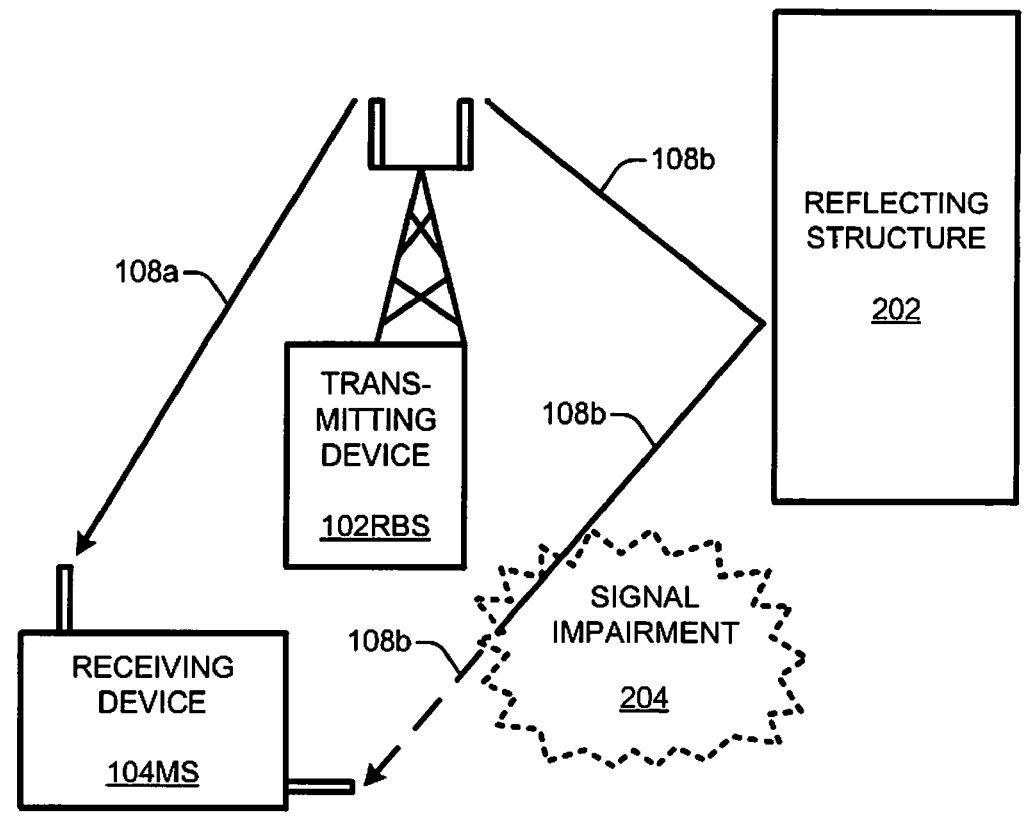
FIG. 2 is a block diagram illustrating an example communication between a transmitting device and a receiving device.

FIG. 2 is a block diagram illustrating an example communication 200 between a transmitting device 102RBS and a receiving device 104MS. As illustrated, communication 200 also involves a reflecting structure 202, signal impairment 204, and signal paths 108a and 108b. With example communication 200, transmitting device 102 is realized as a radio base station transmitting device 102RBS. Receiving device 104 is realized as a mobile station receiving device 104MS. However, this is merely one example implementation for a WCDMA-based embodiment. Alternatively, the transmitting device may be a remote terminal of some type, and the receiving device may be a part of the infrastructure of some wireless network. Also, transmitting devices and/or receiving devices may be devices that operate outside of cellular-type wireless networks or even those that operate within a wired network.

In an example embodiment, transmitting device 102RBS transmits signal 108 to receiving device 104MS. Signal 108 propagates over the channel (not explicitly shown in FIG. 2) along two different signal paths 108a and 108b. Signal path 108a is a direct path between transmitting device 102RBS and receiving device 104MS. Signal path 108b is an indirect path that reflects off of reflecting structure 202 before reaching receiving device 104MS. Thus, signal 108 follows a multipath 108a,108b from transmitting device 102RBS to receiving device 104MS. In this instance, signal path 108b arrives at receiving device 104MS after signal path 108a due to the delay caused by the reflected path.

At least signal path 108b is impacted by signal impairment 204. Signal impairment 204 may include, for example, those impairments caused by both interference and noise. It should be understood that signal impairment 204 is not a physical aspect of communication 200. Noise may arise naturally, and interference may arise due to multipath propagation. Receiving device 104MS thus receives signals via a dispersive, multipath channel. This dispersive, multipath channel results in different versions of the same communicated signal being received, including possibly at different times.

Receiving device 104MS is responsible for combining signal paths 108a and 108b, as affected by signal impairment 204, into signal 108. From signal 108, receiving device 104MS may reconstruct the communicated information. One mechanism for collecting signal energy from multiple signal paths 108a, 108b is a G-Rake receiver. Signal paths 108a and 108b are despread with assigned fingers and then combined in accordance with determined combining weights using the G-Rake receiver. With a G-Rake receiver, the determined combining weights are also intended to counteract the effects of signal impairment 204 by assigning fingers to non-signal delays as well as to signal delays. Operation of an example G-Rake receiver is described further herein, especially with reference to FIG. 5.

It should be noted that communication 200 is a relatively simple illustration. For example, there may be more than two signal paths 108a and 108b received at receiving device 104MS. Also, each signal path may be impacted by the same or different reflecting structures 202 and/or signal impairments 204. Other factors may also impact the signal during transmission, propagation, and/or reception. Additionally, each of transmitting device 102RBS and receiving device 104MS may have more antennas in a MIMO scenario than the two that are shown. In other words, although a 2×2 MIMO scenario is explicitly illustrated, either or both of the devices may have more antennas to support N×M MIMO scenarios generally.

Figure 3:
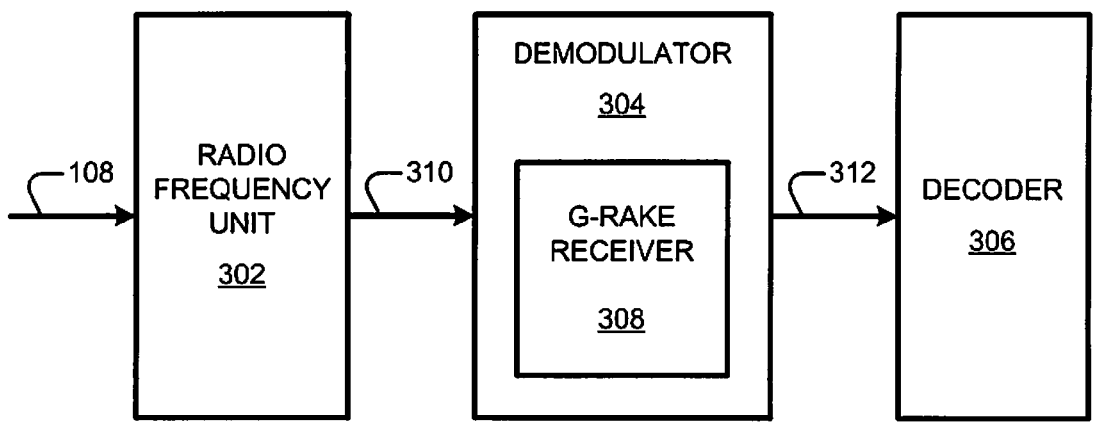
FIG. 3 is a block diagram of example components of a receiving device, including a demodulator having a G-Rake receiver.

FIG. 3 is a block diagram of example components of a receiving device 104, including a demodulator 304 having a G-Rake receiver 308. As illustrated, receiving device 104 includes three components in a receiving chain: a radio frequency unit 302, a demodulator 304, and a decoder 306. For an example embodiment, G-Rake receiver 308 is implemented as part of the demodulator 304. Alternatively, at least part of the G-Rake receiver's functionality may be implemented apart from the demodulator.

In an example operation, radio frequency unit 302 accepts an incoming signal 108 that may be a multipath signal having signal paths 108a and 108b (from FIGS. 1 and 2). Radio frequency unit 302 mixes signal 108 down to a baseband signal 310. Baseband signal 310 is provided to demodulator 304. Demodulator 304, using G-Rake receiver 308, demodulates baseband signal 310 to produce demodulated symbols 312. Demodulated symbols 312 are forwarded from demodulator 304 to decoder 306. Decoder 306 decodes demodulated symbols 312 to recover the information being communicated to receiving device 104.

In an example embodiment, the receiver structure, including G-Rake receiver 308, may be employed in a MIMO scenario. The receiver structure may be linear and mitigate the effects of interference. The receiving chain may therefore be capable of accounting for code-reuse interference arising from the transmission and reception of multiple streams. Also, an example receiver structure addresses the standardized D-TxAA concept, but it is sufficiently general so as to encompass any MIMO scheme, particularly those that involve pre-coding at the transmitter.

Figure 4:
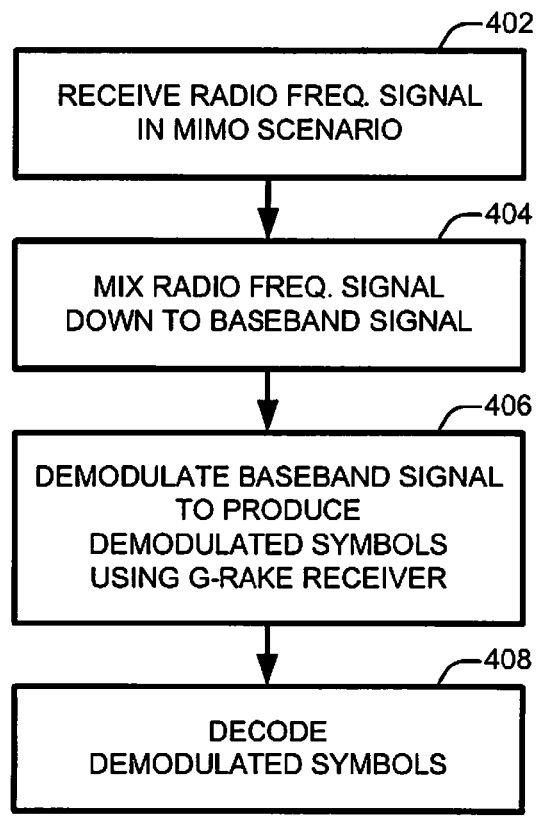
FIG. 4 is a flow diagram of an example general reception method for a receiving device that includes an act of demodulating a signal using a G-Rake receiver.

FIG. 4 is a flow diagram 400 of an example general reception method for a receiving device that includes an act of demodulating a signal using a G-Rake receiver. As illustrated, flow diagram 400 includes four blocks 402-408. Flow diagram 400 may be implemented by a communication node or device, such as a receiving device 104 (of FIGS. 1-3). The acts of flow diagram 400, as well as other flow diagrams described herein, may be effected with processor-executable instructions. Processor-executable instructions may be embodied as hardware, firmware, software, fixed logic circuitry, combinations thereof, and so forth. Example operational implementations of processor-executable instructions include, but are not limited to, a memory coupled to a processor, an application-specific integrated circuit (ASIC), a digital signal processor and associated code, some combination thereof, and so forth.

In an example embodiment, flow diagram 400 depicts a method for a receiving device that is receiving a signal in a MIMO scenario in which two or more streams are being communicated at least from time to time. The method includes receiving, mixing, demodulating, and decoding. At block 402, a radio frequency signal is received in a MIMO scenario. For example, receiving device 104 may receive two or more streams as signal 108 having signal paths 108a and 108b from a transmitting device 102, with each of transmitting device 102 and receiving device 104 having two or more antennas.

At block 404, the received radio frequency signal is mixed down to a baseband signal. For example, radio frequency unit 302 may mix signal 108 down to baseband signal 310. At block 406, the baseband signal is demodulated to produce demodulated symbols using a G-Rake receiver. For example, demodulator 304 may demodulate baseband signal 310 using G-Rake receiver 308 to produce demodulated symbols 312. At block 408, the demodulated symbols are decoded. For example, decoder 306 may decode demodulated symbols 312 so that the communicated information may be recovered (e.g., through further processing).

Figure 5:
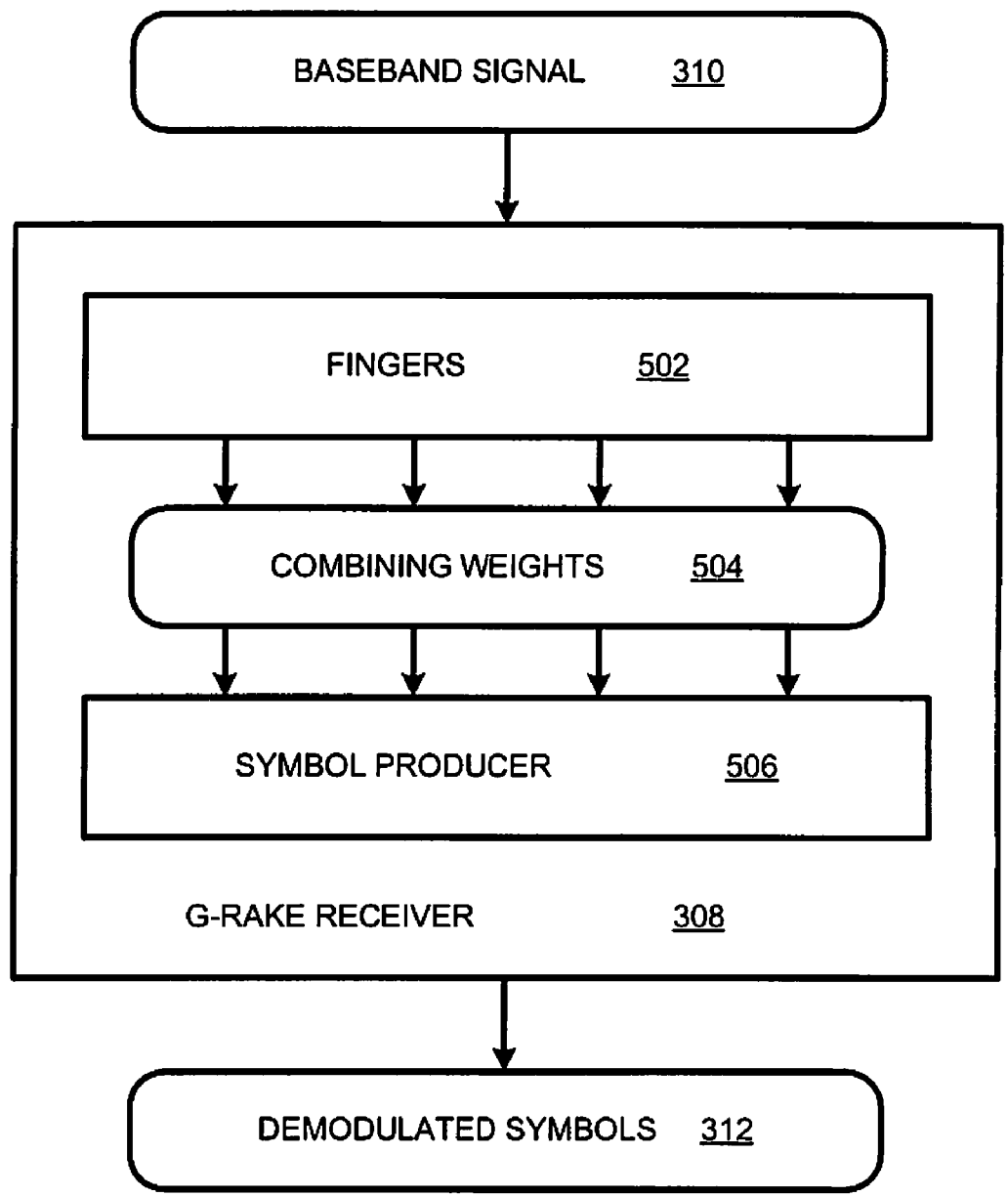
FIG. 5 is a block diagram of an example G-Rake receiver that uses combining weights to demodulate a received signal.

FIG. 5 is a block diagram 500 of an example G-Rake receiver 308 that uses combining weights 504 to demodulate a received signal. As illustrated, block diagram 500 includes baseband signal 310, G-Rake receiver 308, and demodulated symbols 312. G-Rake receiver 308 includes fingers 502, combining weights 504, and a symbol producer 506. As described in an example above (e.g., with particular reference to FIG. 3), G-Rake receiver 308 processes baseband signals 310 to produce demodulated symbols 312 as part of demodulator 304.

In an example embodiment, baseband signal 310 is supplied to fingers 502 of G-Rake receiver 308. Fingers 502 despread baseband signal 310 by correlating with the composite channelization/scrambling code delayed by a finger-specific amount. Each respective delay is the processing delay associated with a respective finger. The despread values contain the signal and the impairment (i.e., the signal and the noise plus interference). The interference may result from any number of sources. Example interference sources include, by way of example, other symbols of interest (e.g., self-interference), symbols intended for other users in the cell (e.g., own-cell interference), symbols intended for other users in other cells (e.g., other-cell interference), a combination thereof, and so forth. The interference may be suppressed by determining appropriate combining weights 504.

Combining weights 504 are used by symbol producer 506 to combine (e.g., sum) the despread values to produce demodulated symbols 312. Generally, in addition to estimating the channel over which the signal is propagated, G-Rake receiver 308 estimates the correlation between the impairment (i.e., the interference plus noise) on different fingers. The correlation can be considered to represent the "color" of the impairment. This correlation data can be used to suppress interference. Both channel estimates and impairment correlation estimates are used to form combining weights 504. As a result, the combining process performed by symbol producer 506 of G-Rake receiver 308 both collects signal energy and suppresses interference using combining weights 504.

Example nonparametric embodiments for determining combining weights 504 for G-Rake receiver 308 are described herein below. There are one-stage and two-stage example embodiments for described nonparametric G-Rake receivers. Relatively general example embodiments for both one-stage and two-stage embodiments are described below with particular reference to FIGS. 6 and 7. Relatively specific example embodiments for both one-stage and two-stage embodiments are described below with particular reference to FIGS. 8 and 9. Example embodiments for one-stage approaches are described herein below with particular reference to FIG. 10. Example embodiments for two-stage approaches are described herein below with particular reference to FIG. 11.

Figure 6:
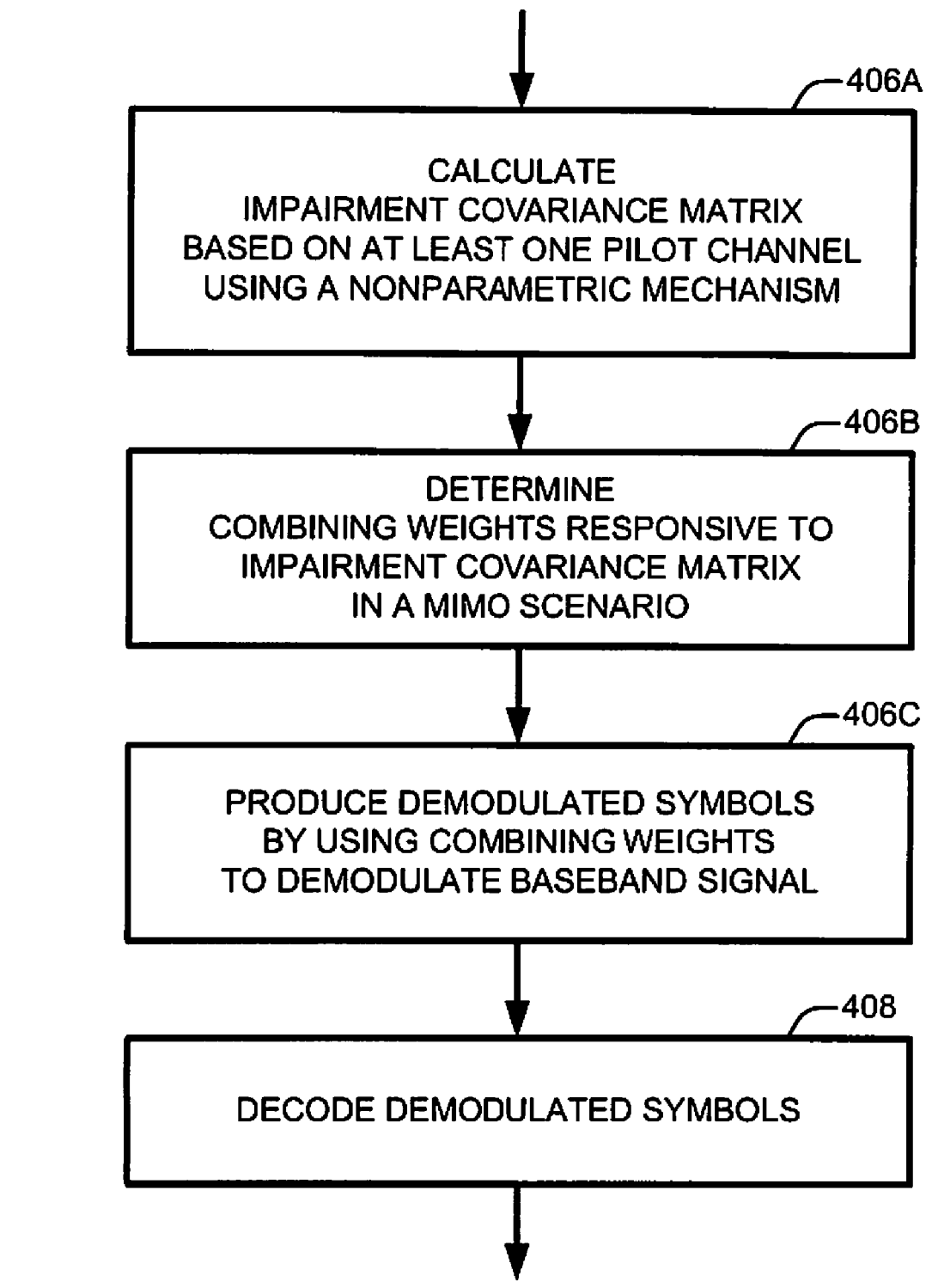
FIG. 6 is a flow diagram of an example general method for demodulating a signal with a G-Rake receiver using a nonparametric mechanism in a MIMO scenario.

FIG. 6 is a flow diagram 600 of an example general method for demodulating a signal with a G-Rake receiver using a nonparametric mechanism in a MIMO scenario. As illustrated, flow diagram 600 includes four blocks 406A, 406B, 406C, and 408. The acts of flow diagram 600 may be effected with processor-executable instructions. More specifically, the acts of blocks 406A, 406B, and 406C may be implemented by a G-Rake receiver, such as a G-Rake receiver 308 (e.g., of FIGS. 3, 5, 7, and 8) of a demodulator 304. The act(s) of block 408 may be implemented by a decoder, such as a decoder 306 (of FIGS. 3 and 7).

For example embodiments, the acts of block 406 (of FIG. 4) have been separated into blocks 406A, 406B, and 406C in flow diagram 600. At block 406A, an impairment covariance matrix is calculated based on at least one pilot channel using a nonparametric mechanism. This calculation may be accomplished in a MIMO scenario in which at least one code-reuse interference term exists in multiple-stream situations. A pilot channel is a channel in a wireless communications system, such as a cellular wireless system, that provides known information that can be used for discovery, to synchronize with the system, to calibrate reception, combinations thereof, and so forth. By way of example, a pilot channel may be broadcast on the downlink in a communications system with constant power and a known symbol sequence.

A nonparametric mechanism is a relatively blind mechanism that does not rely on a model of the transmitted signal to calculate the impairment covariance matrix. Instead, it involves a comparison performed between actual received and demodulated symbol values and expected symbol values based on what is known to have been transmitted. For this comparison, a pilot channel may be used, for instance. Example implementations for nonparametric mechanisms are described herein below including, but not limited to, those involving equations (12), (13), and (14).

At block 406B, combining weights are determined responsive to the impairment covariance matrix in a MIMO scenario. This determination may be accomplished by accounting for the at least one code-reuse interference term. At block 406C, demodulated symbols are produced by using combining weights to demodulate a baseband signal. At block 408, the demodulated signals are decoded. Example general implementations for the actions of flow diagram 600 are described below with particular reference to FIG. 7. More specific example implementations are described below with particular reference to FIGS. 8 and 9.

Figure 7:
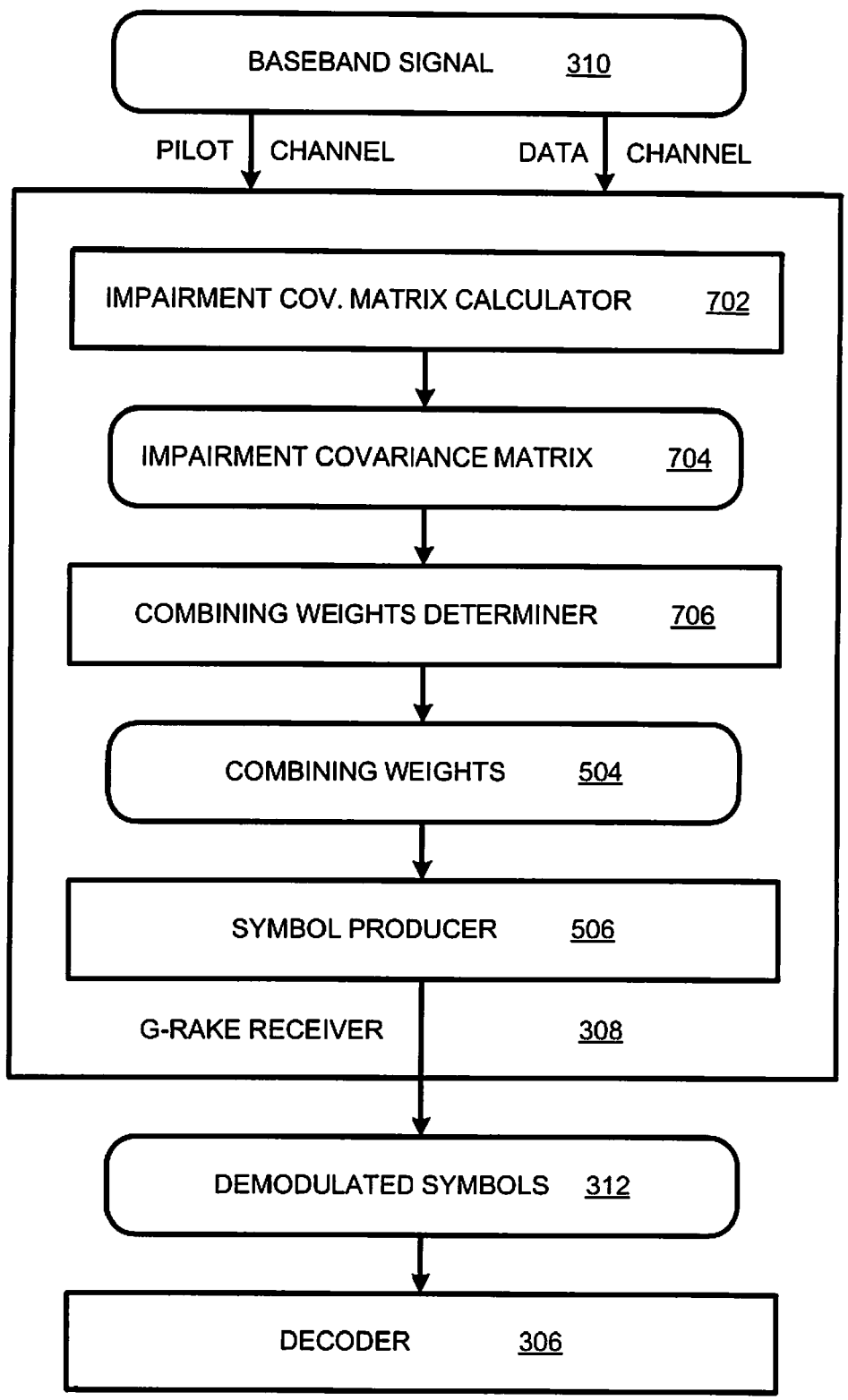
FIG. 7 is a block diagram of a general example of a G-Rake receiver that is adapted to demodulate a signal using a nonparametric mechanism in a MIMO scenario.

FIG. 7 is a block diagram 700 of a general example of a G-Rake receiver 308 that is adapted to demodulate a signal using a nonparametric mechanism in a MIMO scenario. As illustrated, block diagram 700 includes baseband signal 310, demodulated symbols 312, and decoder 306 in addition to G-Rake receiver 308. G-Rake receiver 308 includes an impairment covariance matrix calculator 702, an impairment covariance matrix 704, a combining weights determiner 706, combining weights 504, and symbol producer 506.

In an example embodiment, baseband signal 310 may be a pilot channel at times and a data channel at other times. Impairment covariance matrix calculator 702 is to calculate impairment covariance matrix 704 based on at least one pilot channel using a nonparametric mechanism (e.g., in accordance with block 406A of FIG. 6). By way of example, impairment covariance matrix 704 may be calculated by impairment covariance matrix calculator 702 using a nonparametric mechanism, such as one of those described herein below in the context of equations (12), (13), and (14).

Impairment covariance matrix 704 is forwarded from impairment covariance matrix calculator 702 to combining weights determiner 706. Combining weights determiner 706 is to determine combining weights 504 responsive to impairment covariance matrix 704 in a MIMO scenario (e.g., in accordance with block 406B of FIG. 6). Combining weights determiner 706 also uses effective channel coefficients to determine combining weights 504. Effective channel coefficients reflect a current channel condition and account for multi-stream situations that involve pre-coding at the transmitter. Estimating effective channel coefficients using a pilot channel is described herein below. By way of example, combining weights determiner 706 may determine combining weights 504 using a one-stage scheme with equations (16) and (17) or a two-stage scheme with equations (18), (19), (20), and (21) (the equations are described herein below).

Combining weights 504 are forwarded from combining weights determiner 706 to symbol producer 506. Symbol producer 506 is to produce demodulated symbols 312 by using combining weights 504 to demodulate a baseband signal (e.g., in accordance with block 406C of FIG. 6). Demodulated symbols 312 are forwarded from symbol producer 506 of G-Rake receiver 308 to decoder 306. Decoder 306 is to decode demodulated symbols 312 (e.g., in accordance with block 408 of FIGS. 4 and 6) to enable recovery of the transmitted information (possibly after additional processing).

In the description below, a 2×2 MIMO scenario is used in which there are two transmit antennas and two receive antennas. However, a 2×2 MIMO scenario is used by way of example only, for the principles are applicable to N×M MIMO scenarios generally. Herein below, it is described how a nonparametric estimate of the impairment covariance matrix may be obtained from pilot symbols that are transmitted from both transmit antennas. For release 7 MIMO, for example, one of the possible pilot schemes employs the same length-256 spreading code for each transmit antenna, but different (orthogonal) pilot symbol patterns on the two transmit antennas. This is often referred to as a diversity pilot scheme. However, the principles of the present invention may be employed with alternative pilot schemes.

Figure 8:
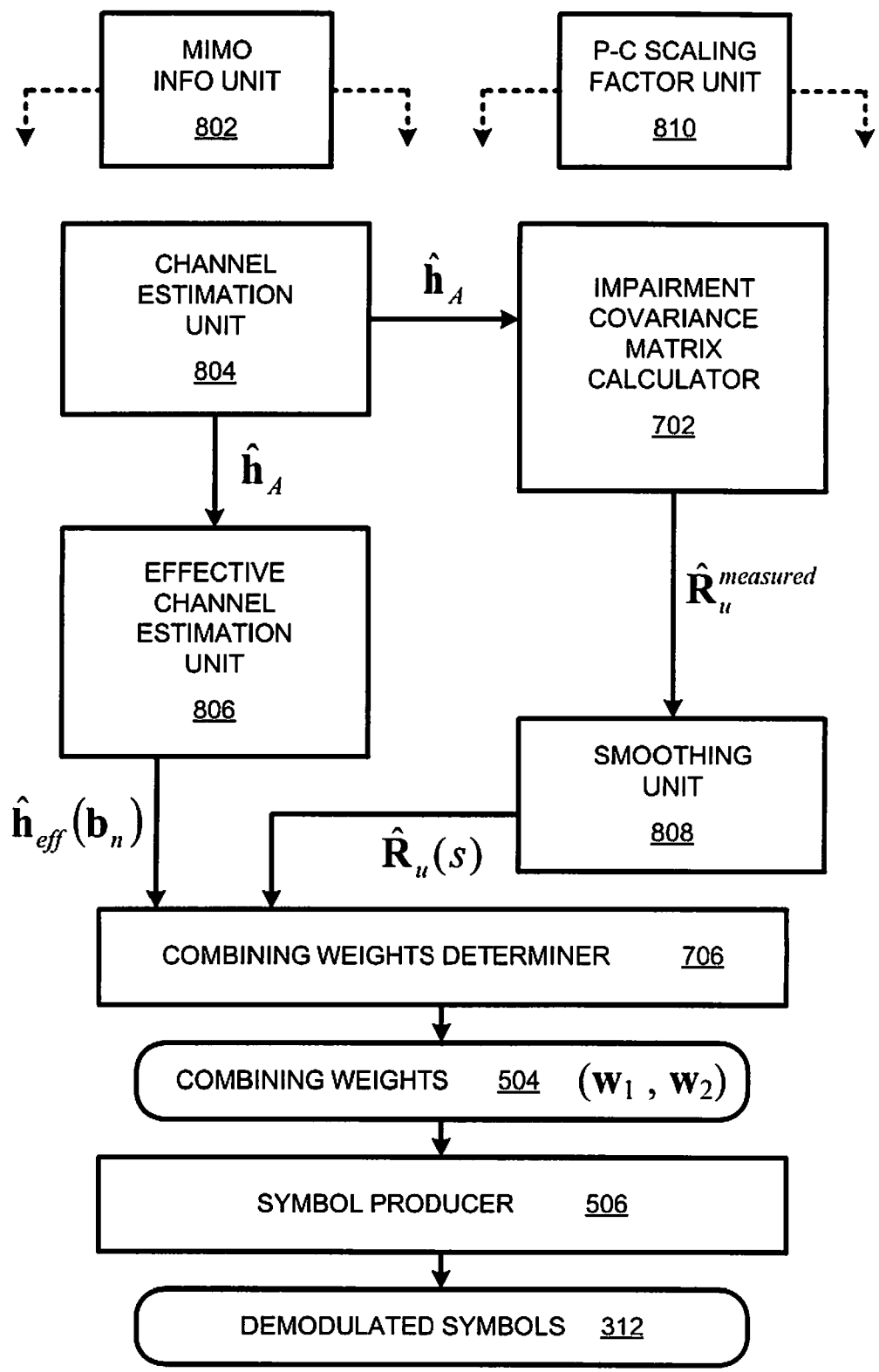
FIG. 8 is a block diagram of a specific example of a G-Rake receiver that is adapted to demodulate a signal by determining combining weights with a measured impairment covariance matrix.

FIG. 8 is a block diagram of a specific example of a G-Rake receiver 308 that is adapted to demodulate a signal by determining combining weights with a measured impairment covariance matrix. As illustrated, G-Rake receiver 308 includes demodulated symbols 312, combining weights 504, symbol producer 506, impairment covariance matrix calculator 702, and combining weights determiner 706. G-Rake receiver 308 also includes a MIMO information unit 802, a channel estimation unit 804, an effective channel estimation unit 806, a smoothing unit 808, and a per-code scaling factor unit 810. Example embodiments for a G-Rake receiver that are applicable to both one-stage and two-stage implementations are described with reference to the G-Rake receiver 308 of FIG. 8.

MIMO information unit 802 is to obtain MIMO information from a control channel. MIMO information may pertain to, for example, pre-coding values, pilot channel power, number of streams, data power, number of spreading codes used, and so forth. Different sets of MIMO information that may be utilized in different one or two stage implementations is indicated in, or otherwise apparent from, the descriptions herein below. As indicated by the dashed arrows in FIG. 8, the MIMO information may be distributed to other blocks of G-Rake receiver 308.

Channel estimation unit 804 is to compute a net channel estimate for each antenna in the form of channel coefficients based on at least one pilot channel. In example embodiments, a net channel estimate $\hat{h}_A$ may be computed on a per-antenna basis, e.g., for A=1, 2. Thus, the per-antenna net channel estimate $\hat{h}_A$ is given by equation (10):

$$\hat{h}_A = \frac{1}{J}\sum_{k=0}^{J-1} x_p(k) s_A^*(k), \tag{10}$$

where $x_p(k)$ is a vector of despread pilot symbols for the $k^{th}$ super-symbol in a slot; where despreading is performed over 512 chips (e.g., two pilot symbol periods); where A is the transmit antenna index (A=1 or A=2), $s_A(k)$ is the $k^{th}$ pilot super-symbol for antenna A; and J=5 is the number of pilot super-symbols per slot. For the first antenna, the pilot super-symbols are given by $$s_1(k) = \frac{1}{\sqrt{2}}(1+j)$$

for each k. For the second antenna, the pilot-super-symbol is given by $$s_2(k) = \frac{1}{\sqrt{2}}(1+j)(-1)^{k+i},$$

where i=0K 14 indexes slots within a radio frame.

It should be understood that the despreading may be performed over a number of chips that is different from 512, that the number of antennas A may be greater than 2, and that the number of pilot super-symbols per slot J may be different from 5. Furthermore, the pilot super-symbols $s_A(k)$ may be defined differently. The net channel estimate $\hat{h}_A$ may reflect the effects of the transmit/receive filters as well as the medium response. The net channel estimate $\hat{h}_A$ is provided to impairment covariance matrix calculator 702 and effective channel estimation unit 806.

When two or more streams are being received in a MIMO scenario, effective channel estimation unit 806 is to compute an effective net channel estimate (e.g., the effective channel coefficients). In such situations, effective channel estimation unit 806 is to estimate the effective channel coefficients responsive to coefficients of individual channels and the pilot channel power across antennas.

More specifically, effective channel estimation unit 806 is to compute effective net channel estimates based on the net channel estimates $\hat{h}_A$ and to account for the code reuse with multiple streams (i.e., two or more streams). Based on the net channel estimates $\hat{h}_A$, effective channel estimation unit 806 may compute the effective net channel estimate $\hat{h}_{eff}(b_n)$, e.g. for n=1, 2, responsive to the pilot channel power allocations $\gamma_p$ using equation (11):

$$\hat{h}_{eff}(b_n) = b_{n1}\hat{h}_1 + b_{n2}\sqrt{\frac{\gamma_p(1)}{\gamma_p(2)}}\hat{h}_2. \tag{11}$$

The effective net channel estimates $\hat{h}_{eff}(b_n)$ account for the pre-coding of stream n. The effective net channel estimate may reflect the effects of the transmit/receive filters, the medium response, and the pre-coding applied at the transmitter. The effective net channel estimates $\hat{h}_{eff}(b_n)$ are provided to combining weights determiner 706.

Impairment covariance matrix calculator 702 is to calculate an impairment covariance matrix using a nonparametric mechanism. The impairment covariance matrix $\hat{R}_{u,A}^{measured}$ may be measured on each antenna or channel using equation (12) below. Thus, the total impairment covariance matrix may be calculated by calculating per antenna quantities and then combining those per-antenna results. The measured per-antenna impairment covariance matrix may be calculated from equation (12):

$$\hat{R}_{u,A}^{measured} = \frac{1}{J-1}\sum_{k=0}^{J-1}(x_p(k)s_A^*(k) - \hat{h}_A)(x_p(k)s_A^*(k) - \hat{h}_A)^H, \tag{12}$$

where $x_p(k)$ is a vector of despread pilot symbols for the $k^{th}$ super-symbol in a slot, A is the transmit antenna index (e.g., A=1 or A=2), $s_A(k)$ is the $k^{th}$ pilot super-symbol for antenna A, and J is the number of pilot super-symbols per slot. The variables may take the same values, for instance, as the example values provided above with regard to computing the net channel estimate $\hat{h}_A$ with equation (10).

The total measured impairment covariance matrix $\hat{R}_u^{measured}$ may be computed from multiple per-channel impairment covariance matrices $\hat{R}_{u,A}^{measured}$ (e.g., via a summing operation). Thus, the total measured impairment covariance matrix (excluding code reuse) is obtainable from equation (13):

$$\hat{R}_u^{measured} = \hat{R}_{u,1}^{measured} + \hat{R}_{u,2}^{measured}. \tag{13}$$

Impairment covariance matrix calculator 702 provides impairment covariance matrix $\hat{R}_u^{measured}$ directly to combining weights determiner 706 or indirectly via smoothing unit 808 when smoothing is being implemented.

Smoothing unit 808, when implemented, is to smooth the impairment covariance matrix $\hat{R}_u^{measured}$ responsive to one or more previous versions of the impairment covariance matrix. Increased performance can generally be obtained by smoothing the measured impairment covariance matrix based on values from one or more previous slots. Smoothing may be accomplished using any of many techniques. Using one example technique for smoothing, the total smoothed estimate of the impairment covariance matrix or overall impairment covariance matrix is given by equation (14):

$$\hat{R}_u(s) = \lambda \hat{R}_u(s-1) + (1-\lambda)\hat{R}_u^{measured}, \tag{14}$$

where $0 \leq \lambda \leq 1$ and s denotes the slot index. Thus, the total measured impairment covariance matrix $\hat{R}_u^{measured}$ may be smoothed using at least one previous value with equation (14) to obtain a smoothed measured impairment covariance matrix $\hat{R}_u(s)$. Hence, equation (13) and/or equation (14), in addition to equation (12), may be used as part of block 406A (of FIG. 6) to calculate a total measured impairment covariance matrix. This smoothed impairment covariance matrix $\hat{R}_u(s)$ is forwarded from smoothing unit 808 to combining weights determiner 706.

Combining weights determiner 706 accepts the impairment covariance matrix $\hat{R}_u(s)$ from smoothing unit 808 (or directly from impairment covariance matrix calculator 702) and the effective net channel estimates $\hat{h}_{eff}(b_n)$ from effective channel estimation unit 806. One set of combining weights $w_1$ is determined for single stream situations, or two sets of combining weights $w_1$ and $w_2$ are determined for dual stream situations.

Combining weights determiner 706 is to determine combining weights for G-Rake receiver 308 using a one-stage or a two-stage scheme. Combining weights are determined "directly" with the one-stage scheme. Combining weights are determined "indirectly" from intermediate combining weights with the two-stage scheme. These one and two stage schemes are described herein below with particular reference to FIGS. 10 and 11, respectively.

Combining weights determiner 706 provides combining weights 504 (e.g., combining weights $w_1$ or combining weights $w_1$ and $w_2$) to symbol producer 506. Symbol producer 506 is to demodulate received signals using combining weights 504 to produce demodulated symbols 312. Symbol producer 506 may be separate from G-Rake receiver 308 (e.g., it may be part of demodulator 304 (of FIG. 3) but not necessarily part of G-Rake receiver 308).

Per-code scaling factor unit 810 is to compute a per-code scaling factor. The per-code scaling factor $\alpha_{PC}$ is a per-code energy-scaling factor that accounts for the (potential) power ratio between the pilot channel used to estimate effective net channel coefficients and the data channel. It is used in at least some of the implementations for both one-stage and two-stage schemes when determining combining weights, as is described further herein below. Hence, per-code scaling factor unit 810 may provide the per-code scaling factor $\alpha_{PC}$ to combining weights determiner 706.

The per-code scaling factor $\alpha_{PC}$ may be computed directly or indirectly. The per-code scaling factor $\alpha_{PC}$ may be obtained relatively directly using, for example, an approach that solves equation (15):

$$\hat{\alpha}_{PC} = \frac{1}{K}\left(\frac{SF_{data}}{SF_{pilot}}\right)\left(\frac{\gamma_s(1)}{\gamma_p(1)}\right)\Gamma_{D/P}. \quad (15)$$

The variables $SF_{data}$ and $SF_{pilot}$ refer to the spreading factors of the data and pilot channels respectively, while the variable K represents the number of codes used for data transmission. A value for the data-to-pilot power ratio $\Gamma_{D/P}$ may be estimated using any of a number of different methods that are known in the art and/or that are described herein. Generally, the power ratio $\Gamma_{D/P}$ may be determined by measuring the power on a data channel and the power on the pilot channel and then computing their quotient.

As another example method for determining the power ratio, the power ratio $\Gamma_{D/P}$ may be estimated as follows, which may entail using a parallel parametric G-Rake receiver. The parallel G-Rake receiver may implement equation (1), or a simplified version thereof. As such, matrix quantities (i.e., $R_{ij}$) are computed, and the associated scaling terms ($\alpha_i$) are estimated. The scaling terms may be estimated using a least squares fitting process, which minimizes the error between the measured impairment covariance matrix from equation (13) and the right hand side of equation (1) (or a simplified version thereof). The scale term $\alpha_i$ can then be used as an estimate of $\Gamma_{D/P}$. This method of determining scaling factors for a parametric MIMO G-Rake receiver is described further in a U.S. patent application to Stephen Grant and Douglas A. Cairns, which is entitled "CODE POWER ESTIMATION FOR MIMO SIGNALS", filed on 25 Feb. 2008, and assigned application Ser. No. 12/036,368. U.S. patent application Ser. No. 12/036,368 has the same assignee, Telefonaktiebolaget LM Ericsson, as does the instant patent application.

Alternatively, the per-code scaling factor $\alpha_{PC}$ may be estimated relatively indirectly using the following approach based on the Rake combining of a single despread traffic code. First, the Rake weights for the two streams are determined as $w_1^{Rake}=\hat{h}_{eff}(b_1)$ and $w_2^{Rake}=\hat{h}_{eff}(b_2)$. Second, these Rake weights are then used to separately combine the despread values of a single traffic code. Third, the variance of the combined despread values is then computed for each case (denoted $\sigma_1^2$ and $\sigma_2^2$). Finally, a system of two linear equations in the two unknowns $\alpha_{PC}(1)$ and $\alpha_{PC}(2)$ is solved to obtain the desired per-code scaling factors directly. The system of equations is a function of the Rake weights, the effective net channel estimates, the computed variances $\sigma_1^2$ and $\sigma_2^2$, and the measured impairment covariance matrix $\hat{R}_u^{measured}$ given by equation (13). This approach is described further in a patent application to Stephen Grant, which is entitled "CODE POWER ESTIMATION FOR MIMO SIGNALS", filed on 25 Feb. 2008, and assigned application Ser. No. 12/036,425. U.S. patent application Ser. No. 12/036,425 has the same assignee, Telefonaktiebolaget LM Ericsson, as does the instant patent application.

Figure 9:
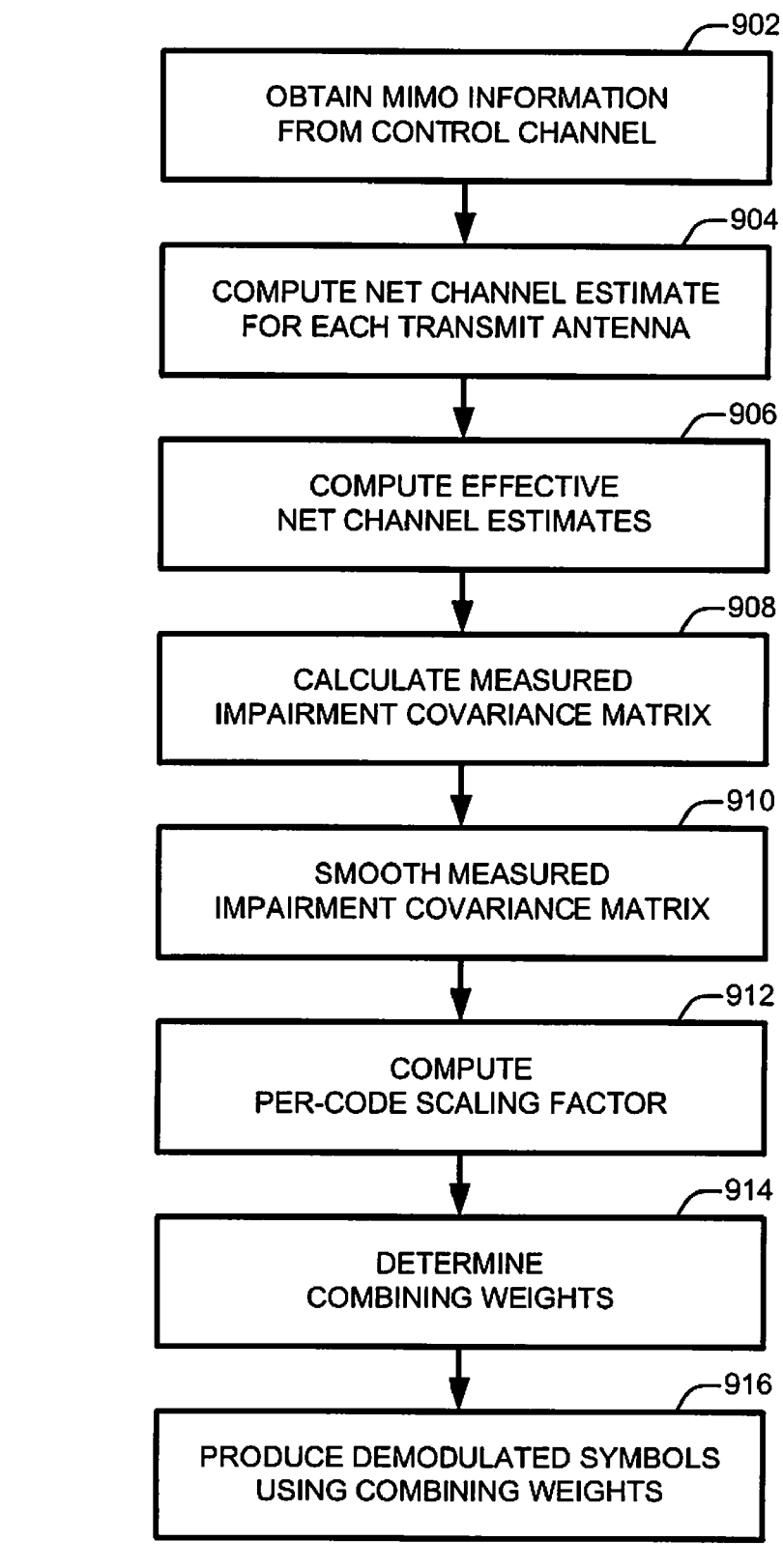
FIG. 9 is a flow diagram of an example specific method for demodulating a signal using a G-Rake receiver by determining combining weights with a measured impairment covariance matrix.

FIG. 9 is a flow diagram 900 of an example specific method for demodulating a signal using a G-Rake receiver by determining combining weights with a measured impairment covariance matrix. As illustrated, flow diagram 900 includes eight blocks 902-916. Flow diagram 900 may be implemented by a G-Rake receiver, such as a G-Rake receiver 308 (of FIGS. 3, 5, 7, and 8). The acts of flow diagram 900 may be effected with processor-executable instructions. Example embodiments for flow diagram 900 are described below with reference to elements from other FIGS., including FIG. 8.

For example embodiments, at block 902, MIMO information is obtained from a control channel. MIMO information may pertain to, for instance, pre-coding values, pilot channel power, number of streams, data power, number of spreading codes used, and so forth. Example implementations that are specific to the ZF, MMSE, and ML criteria as to what MIMO information is obtained are described herein below for two-stage schemes.

At block 904, a net channel estimate is computed for each transmit antenna. For example, a channel estimation unit 804 may compute a per-antenna net channel estimate $\hat{h}_A$ from a pilot channel using equation (10), e.g. for A=1, 2. At block 906, effective net channel estimates are computed. For example, an effective channel estimation unit 806 may compute effective net channel estimates $\hat{h}_{eff}(b_n)$, e.g. for n=1, 2, from the net channel estimates $\hat{h}_A$ using equation (11).

At block 908, a measured impairment covariance matrix is calculated. For example, impairment covariance matrix calculator 702 may estimate the total measured impairment covariance matrix $\hat{R}_u^{measured}$ by estimating per-antenna impairment covariance matrix $\hat{R}_u^{measured}$ quantities using equation (12) and then combining those estimates using equation (13). At block 910, the measured impairment covariance matrix may be smoothed. For example, smoothing unit 808 may smooth total measured impairment covariance matrix $\hat{R}_u^{measured}$ to create smoothed impairment covariance matrix $\hat{R}_u(s)$.

At block 912, a per-code scaling factor is computed. For example, per-code scaling factor unit 810 may compute a per-code scaling factor $\alpha_{PC}$ using any of the approaches described above (or a different approach). Especially if the per-code scaling factor $\alpha_{PC}$ is not relevant to the determination of combining weights (e.g., with a ZF criterion implementation of a two-stage scheme), the act(s) of this block may be omitted.

At block 914, combining weights are determined. For example, combining weights determiner 706 may determine combining weights 504 $w_1$, and/or $w_2$ responsive to the effective net channel estimates $\hat{h}_{eff}(b_n)$ and the total (e.g., smoothed) impairment covariance matrix $\hat{R}_u(s)$. Both one-stage and two-stage combining weight determination schemes are described herein below with particular reference to FIGS. 10 and 11, respectively.

At block 916, demodulated symbols are produced from a received signal using the combining weights. For example, symbol producer 506 may produce demodulated symbols 312 from a received signal 108 using combining weights 504 $w_1$ and $w_2$.

The descriptions of FIGS. 8 and 9 are directed, at least partially, to a specific example of a G-Rake receiver that is adapted to demodulate a signal by determining combining weights with a measured impairment covariance matrix. Specific example approaches to determining the combining weights are presented below with particular reference to FIGS. 10 and 11. The combining weights are determined so as to account for code-reuse in multi-stream situations. More specifically, with MIMO embodiments, the non-parametrically calculated impairment covariance matrix may contain a code-reuse interference term that is scaled by a per-code energy scaling factor. The code-reuse interference term (e.g., the outer product of at least one of the effective net channel estimates) is a function of at least one effective net channel estimate and the per-code scaling factor. The descriptions below of FIGS. 10 and 11 address example one and two-stage schemes, respectively, for determining combining weights.

Figure 10:
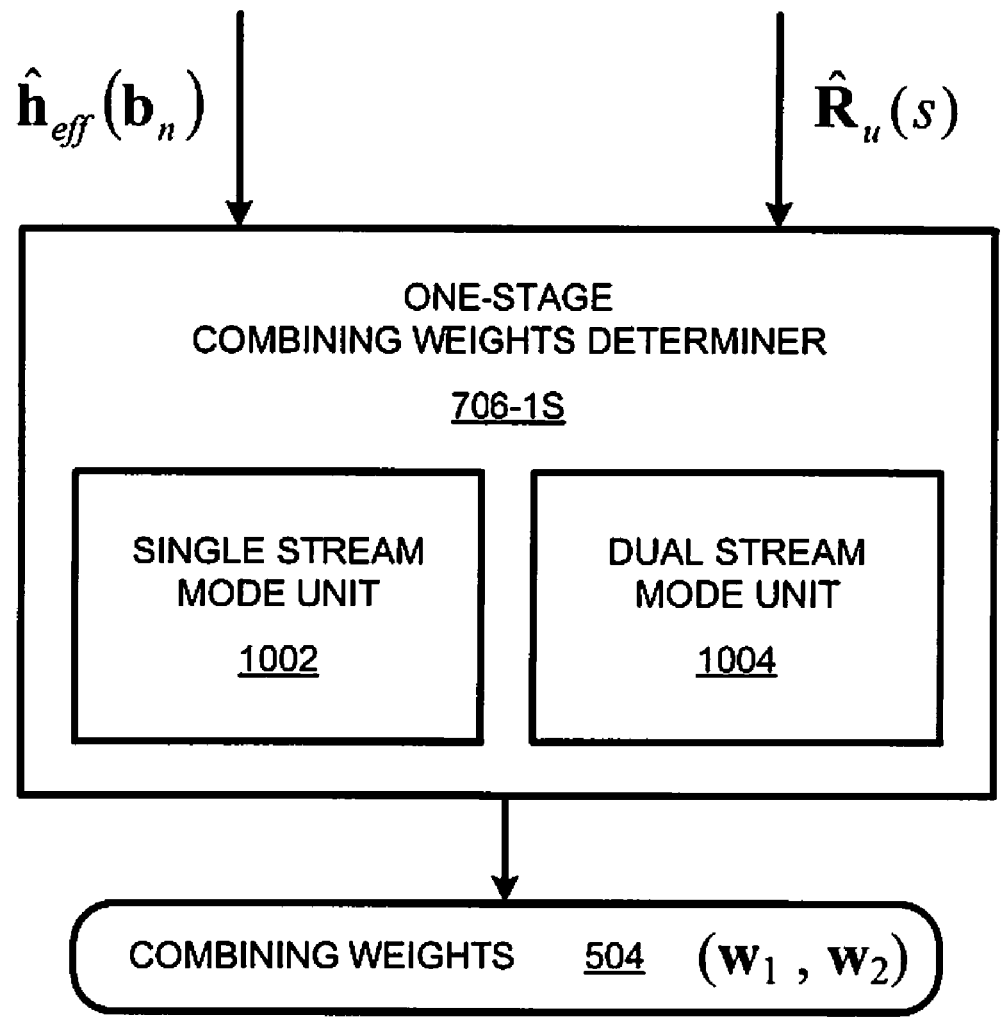
FIG. 10 is a block diagram illustrating an example one-stage scheme for determining combining weights.

FIG. 10 is a block diagram illustrating an example one-stage scheme 1000 for determining combining weights 504. As illustrated, one-stage scheme 1000 includes a one-stage combining weights determiner 706-1S. One-stage combining weights determiner 706-1S includes a single stream mode unit 1002 and/or a dual stream mode unit 1004. In an example embodiment, one-stage combining weights determiner 706-1S accepts as input at least effective net channel estimates $\hat{h}_{\mathit{eff}}(b_n)$ and impairment covariance matrix $\hat{R}_u(s)$ and determines for output combining weights 504. This determination may be performed in one stage, which is described below.

In an example implementation, combining weights 504 depend on whether one or two streams are being transmitted. For single stream mode, the combining weights $w^{single}$ may be obtained by single stream mode unit 1002 by solving the following system of equations (16):

$$\hat{R}_u(s)w^{single} = \hat{h}_{\mathit{eff}}(b), \quad (16)$$

where the notation $\hat{h}_{\mathit{eff}}(b)$ indicates the "effective" net channel coefficients from effective channel estimation unit 806 (of FIG. 8) that depend on the pre-coding vector b. The impairment covariance matrix $\hat{R}_u(s)$ is determined by impairment covariance matrix calculator 702 (of FIGS. 7 and 8). The pre-coding vector b is the first column of a pre-coding matrix B.

For dual stream mode, two sets of combining weights ($w_1^{dual}$, $w_2^{dual}$) are determined by dual stream mode unit 1004 of one-stage combining weights determiner 706-1S. These combining weights 504 may be obtained by solving the following systems of equations (17):

$$\left(\hat{R}_u(s) + \alpha_{PC}(2)\hat{h}_{\mathit{eff}}(b_2)\hat{h}_{\mathit{eff}}^H(b_2)\right)w_1^{dual} = \hat{h}_{\mathit{eff}}(b_1) \quad (17)$$
$$\left(\hat{R}_u(s) + \alpha_{PC}(1)\hat{h}_{\mathit{eff}}(b_1)\hat{h}_{\mathit{eff}}^H(b_1)\right)w_2^{dual} = \hat{h}_{\mathit{eff}}(b_2).$$

Here, the $\hat{h}_{\mathit{eff}}(b_n)$ is the effective net channel coefficient vector due to pre-coding for stream n, and $\alpha_{PC}(n)$ is a per-code scaling factor that multiplies the outer product of the effective net coefficients to account for code reuse interference. The pre-coding vector $b_1$ corresponds to the first column of pre-coding matrix B, and the pre-coding vector $b_2$ corresponds to the second column.

For one-stage scheme 1000, obtained MIMO information may include, for example, pre-coding information (b or B), the allocation of pilot channel power across antennas ($\gamma_p(1)$ and $\gamma_p(2)$), the allocation of data power across streams ($\gamma_s(1)$ and $\gamma_s(2)$), the total number of streams, the number of spreading codes used (K), some combination thereof, and so forth. The per-code scaling factor $\alpha_{PC}(n)$ may be provided by per-code scaling factor unit 810 (of FIG. 8).

For the example embodiments described above with particular reference to FIG. 10, the combining weights for G-Rake receiver demodulation may be determined using a one-stage nonparametric scheme. In other words, (final) combining weights 504 may be produced in one stage. In contrast, example embodiments for two-stage nonparametric schemes are described below with particular reference to FIG. 11 in which final combining weights are produced from intermediate combining weights. It should be noted that the acts performed in the context of these one and two-stage schemes for determining combining weights may be performed as part of the act(s) of block 914 of FIG. 9.

For example embodiments of two-stage nonparametric schemes, a portion of interference that is not due to code reuse (e.g., $R_u$ from equation (1) above) is estimated. This estimate is used to calculate intermediate weight vector(s) in two-stage implementations. In single stream mode for a two-stage implementation, the intermediate weight vector is the final combining weight vector. In dual stream mode, on the other hand, the final combining weight vectors are a function of at least the intermediate weight vectors and the effective channel coefficient vectors.

Figure 11:
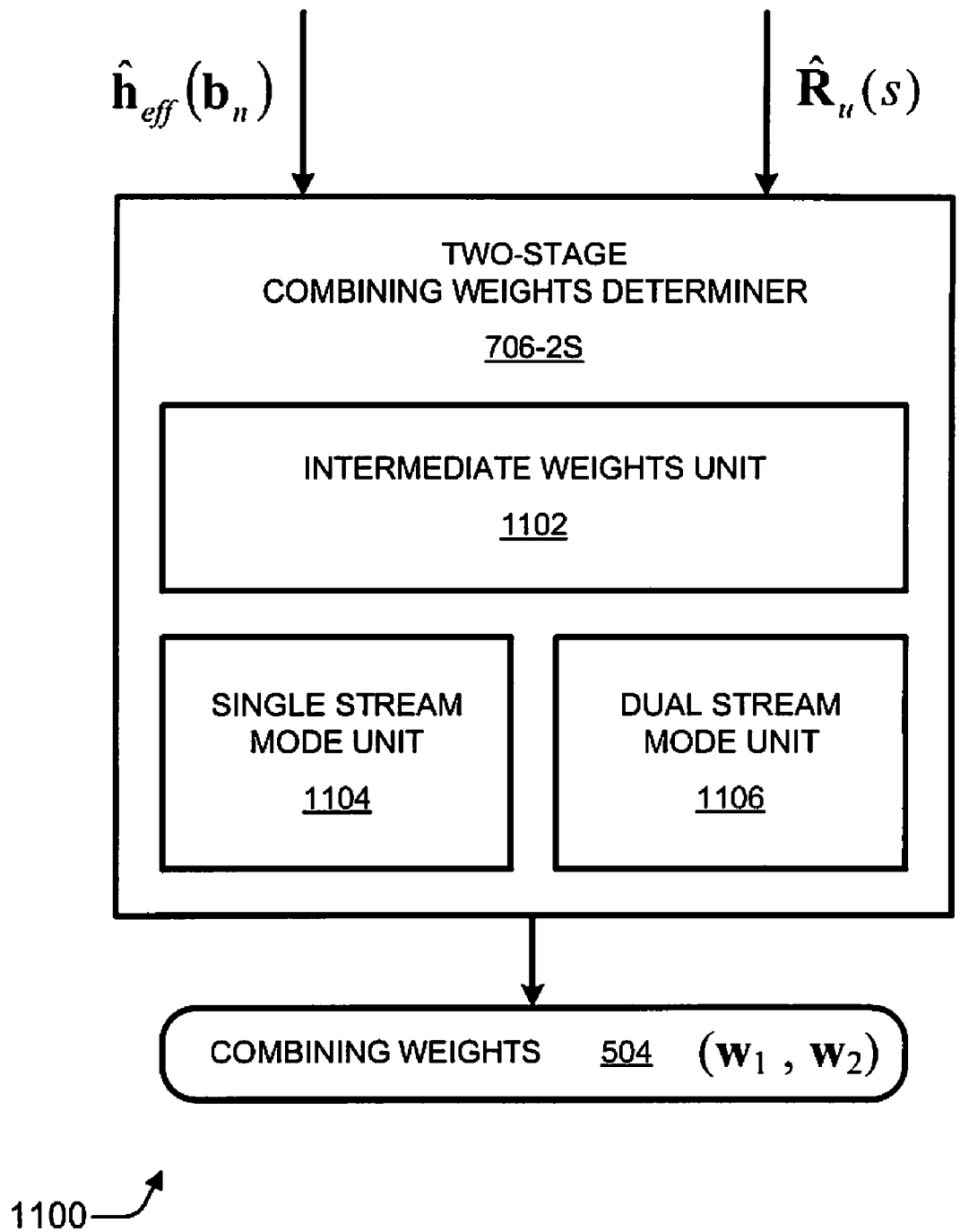
FIG. 11 is a block diagram illustrating an example two-stage scheme for determining combining weights.

FIG. 11 is a block diagram illustrating an example two-stage scheme 1100 for determining combining weights 504. As illustrated, two-stage scheme 1100 includes a two-stage combining weights determiner 706-2S. Two-stage combining weights determiner 706-2S includes (i) an intermediate weights unit 1102 and (ii) a single stream mode unit 1104 and/or a dual stream mode unit 1106. In an example embodiment, two-stage combining weights determiner 706-2S accepts as input at least effective net channel estimates $\hat{h}_{\mathit{eff}}(b_n)$ and measured impairment covariance matrix $\hat{R}_u(s)$ and determines for output combining weights 504. This determination may be performed in two stages, which are described below.

In an example implementation, intermediate combining weights are computed by intermediate weights unit 1102. For example, intermediate weight vectors $v_1$ and $v_2$ may be computed by solving the following sets of equations (18):

$$\hat{R}_u(s)v_1 = \hat{h}_{\mathit{eff}}(b_1) \quad (18)$$
$$\hat{R}_u(s)v_2 = \hat{h}_{\mathit{eff}}(b_2).$$

A solution for the intermediate combining weights $v_1$ and $v_2$ can be obtained from equations (18) using matrix inversion, exactly solving a system of linear equations, iteratively solving a system of linear equations, and so forth. It should be noted that the intermediate combining weights $v_1$ and $v_2$ may also be used in the generation of channel quality indicator (CQI) reports for single-stream transmission situations. Thus, intermediate combining weights $v_1$ and $v_2$ may be computed using equation (18) responsive to the effective net channel estimates $\hat{h}_{\mathit{eff}}(b_n)$ and the impairment covariance matrix $\hat{R}_u(s)$.

Final combining weights $w_1$ and $w_2$ are ascertained responsive to the intermediate combining weights $v_1$ and $v_2$ by single stream mode unit 1104 or dual stream mode unit 1106. The ascertainment of the final combining weights $w_1$ and $w_2$ depends on whether there is a single stream situation or a dual stream situation. For example, when receiving a single stream transmission, $b_1$=b and $b_2$=0, so intermediate weight vector $v_1$ is ascertained to be the final set of combining weights $w_1$ by single stream mode unit 1104. For dual (or more generally multiple) stream transmission, on the other hand, interference due to code reuse is accounted for by dual or multiple stream mode unit 1106 when ascertaining the final combining weights $w_1$ and $w_2$.

Three techniques for addressing code reuse interference in dual stream situations with two-stage schemes are described below. One or more of each technique may be implemented by dual stream mode unit 1106. These three computation techniques are based on zero-forcing (ZF), minimum mean squared error (MMSE), and maximum likelihood (ML) criteria. The final combining weights $w_1$ and $w_2$ may be ascertained responsive to the intermediate combining weights $v_1$ and $v_2$ and responsive to the effective net channel estimates $\hat{h}_{\mathit{eff}}(b_n)$ using equations (19), (20), and (21) (which are presented below) for the ZF, MMSE, and ML criteria, respectively.

Each technique corresponds to "optimality" in terms of the aforementioned ZF, MMSE, or ML criteria. For the MMSE and ML criteria, the per-code scaling factor $\alpha_{PC}$ is also used to ascertain the final combining weights $w_1$ and $w_2$. Hence, with the MMSE and ML criteria, an additional estimate of the data to pilot power ratio $\Gamma_{D/P}$ is used to compute the final combining weight vectors in accordance with equation (15) (or the per-code scaling factor $\alpha_{PC}$ may be computed using a different approach). As described herein above, the data-to-pilot power ratio value may be obtained using a straightforward technique and/or other techniques that are known in the art or that are derivable there from.

Three respective example techniques for the ZF, MMSE, and ML criteria are described below. Each technique enables dual stream mode unit 1106 to account for interference due to code reuse. These descriptions also reference blocks 902, 912, and 914 of FIG. 9 and blocks of FIG. 8. An example embodiment with respect to ZF weights is described first. For the ZF criterion, the dual stream combining weights $w_1^{dual}$ and $w_2^{dual}$ are given by equation (19):

$$[w_1^{dual} \ w_2^{dual}]^H = \left(\begin{bmatrix} v_1^H \\ v_2^H \end{bmatrix} [\hat{h}_{\mathit{eff}}(b_1) \ \hat{h}_{\mathit{eff}}(b_2)]\right)^{-1} \begin{bmatrix} v_1^H \\ v_2^H \end{bmatrix}. \quad (19)$$

With reference to block 902, MIMO information is obtained from the control channel by MIMO information unit 802. This MIMO information may include, for example, precoding information (b or B), the allocation of pilot channel power across antennas ($\gamma_p(1)$ and $\gamma_p(2)$), the total number of streams, some combination thereof, and so forth. With reference to block 914, combining weights are determined by dual stream mode unit 1106 of two-stage combining weights determiner 706-2S. For the dual stream situation, the solution to equation (19) is computed to ascertain the final combining weights $w_1^{dual}$ and $w_2^{dual}$.

With this example approach for a ZF embodiment, the dual stream weights may be computed without knowledge of the per-code scaling factors $\alpha_{PC}(1)$ or $\alpha_{PC}(2)$ (thus enabling the act(s) of block 912 to be omitted). This is somewhat simpler compared to the ML and MMSE embodiments described below that do entail using per-code scaling factors. However, ZF embodiments tend not to perform as well at low to moderate SNRs.

An example embodiment with respect to MMSE weights is described second. For the MMSE criterion, the dual stream combining weights are given by equation (20):

$$[w_1^{dual} \ w_2^{dual}]^H = \left(\alpha_{PC} \begin{bmatrix} v_1^H \\ v_2^H \end{bmatrix} [\hat{h}_{\mathit{eff}}(b_1) \ \hat{h}_{\mathit{eff}}(b_2)] + I\right)^{-1} \begin{bmatrix} v_1^H \\ v_2^H \end{bmatrix}. \quad (20)$$

The variable I represents the identity matrix. To ascertain the dual stream final combining weights with MMSE, an estimate of the per-code scaling factor $\alpha_{PC}$ is computed. Although equation (20) assumes that the per-code scaling is the same for both streams, the principles of the present invention are also applicable to situations in which two or more streams have different per-code scaling.

With reference to block 902, MIMO information is obtained from the control channel by MIMO information unit 802. This MIMO information may include, for example, precoding information (b or B), the allocation of pilot channel power across antennas ($\gamma_p(1)$ and $\gamma_p(2)$), the allocation of data power across streams ($\gamma_s(1)$ and $\gamma_s(2)$), the total number of streams, the number of spreading codes used (K), some combination thereof, and so forth.

With reference to block 914, combining weights are determined by dual stream mode unit 1106 of two-stage combining weights determiner 706-2S. With this dual stream situation, the per-code scaling factor $\alpha_{PC}$ is estimated (in accordance with block 912) by per-code scaling factor unit 810. The solution to equation (20) is computed using the per-code scaling to ascertain the final dual stream combining weights $w_1^{dual}$ and $w_2^{dual}$.

An example embodiment with respect to ML weights is described third. For the ML criterion, the dual stream combining weights are given by equation (21):

$$[w_1^{dual} \ w_2^{dual}] = [v_1 \ v_2] - \quad (21)$$
$$\left[v_2\left(\frac{\alpha_{PC} v_2^H \hat{h}_{\mathit{eff}}(b_1)}{1+\alpha_{PC} v_2^H \hat{h}_{\mathit{eff}}(b_2)}\right) \ v_1\left(\frac{\alpha_{PC} v_1^H \hat{h}_{\mathit{eff}}(b_2)}{1+\alpha_{PC} v_1^H \hat{h}_{\mathit{eff}}(b_1)}\right)\right].$$

To ascertain the dual stream final combining weights with ML, an estimate of the per-code scaling factor $\alpha_{PC}$ is computed. Although equation (21) assumes that the per-code scaling is the same for both streams, the principles of the present invention are applicable to situations in which two or more streams have different per-code scaling factors.

With reference to block 902, MIMO information is obtained from the control channel by MIMO information unit 802. This MIMO information may include, for example, precoding information (b or B), the allocation of pilot channel power across antennas ($\gamma_p(1)$ and $\gamma_p(2)$), the allocation of data power across streams ($\gamma_s(1)$ and $\gamma_s(2)$), the total number of streams, the number of spreading codes used (K), some combination thereof, and so forth.

With reference to block 914, combining weights are determined by dual stream mode unit 1106 of two-stage combining weights determiner 706-2S. With this dual stream situation, the per-code scaling factor $\alpha_{PC}$ is estimated (in accordance with block 912) by per-code scaling factor unit 810. The solution to equation (21) is computed using the per-code scaling factor to ascertain the final dual stream combining weights $w_1^{dual}$ and $w_2^{dual}$.

Figure 12:
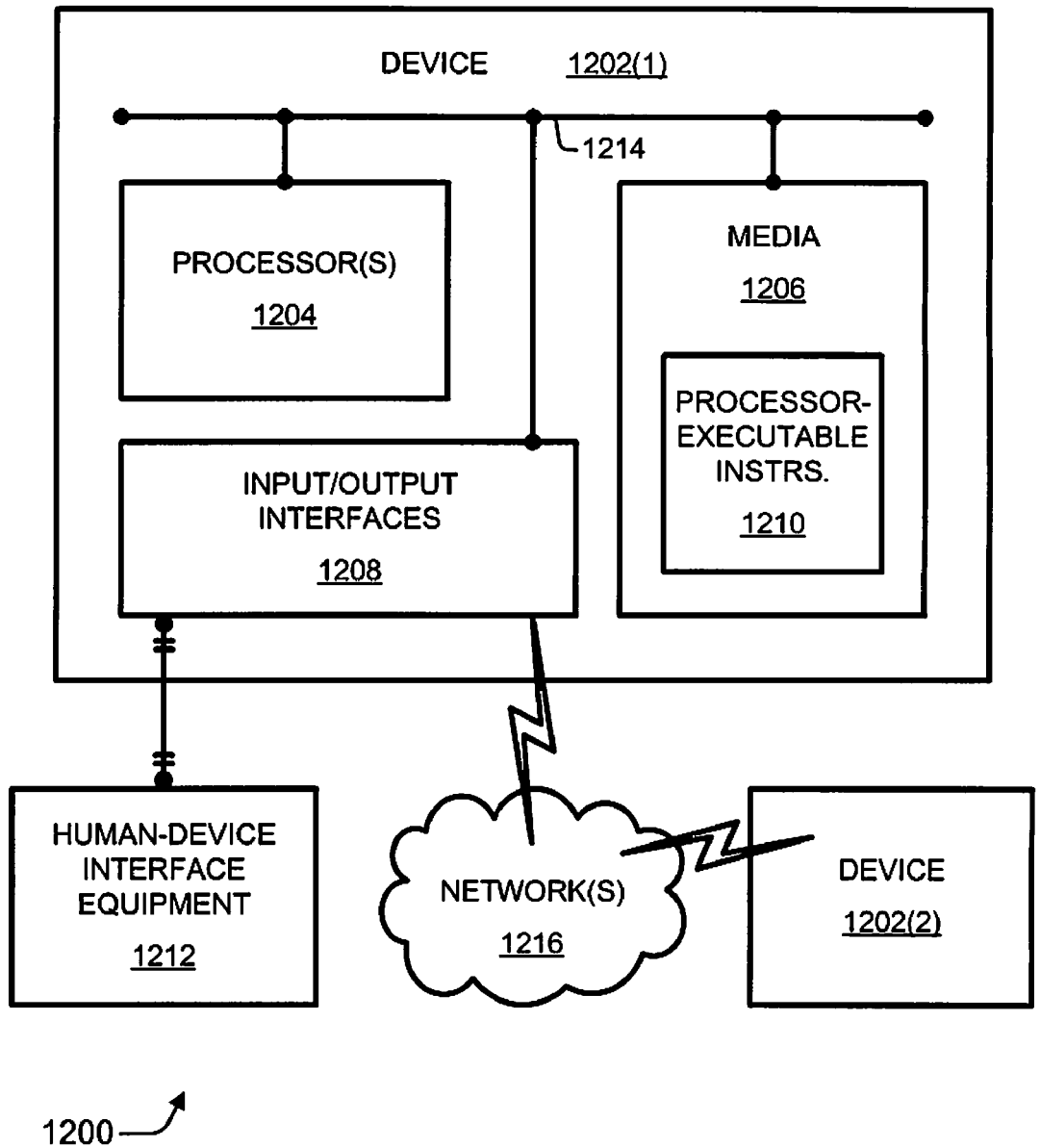
FIG. 12 is a block diagram of example devices that may be used to implement embodiments for nonparametric MIMO G-Rake receivers.

FIG. 12 is a block diagram 1200 of example devices 1202 that may be used to implement embodiments for nonparametric MIMO G-Rake receivers. As illustrated, block diagram 1200 includes two devices 1202(1) and 1202(2), human-device interface equipment 1212, and one or more networks 1216. As explicitly shown with device 1202(1), each device 1202 may include at least one processor 1204, one or more media 1206, one or more input/output interfaces 1208, and at least one interconnection 1214. Media 1206 may include processor-executable instructions 1210. Network(s) 1216 may be, by way of example but not limitation, an internet, an intranet, an Ethernet, a public network, a private network, a cable network, a digital subscriber line (DSL) network, a telephone network, a wired network, a wireless network, some combination thereof, and so forth. Device 1202(1) and device 1202(2) may communicate over network(s) 1216.

For example embodiments, device 1202 may represent any processing-capable device. Processor 1204 may be implemented using any applicable processing-capable technology, and one may be realized as a general-purpose or a special-purpose processor. Examples include, but are not limited to, a central processing unit (CPU), a digital signal processor (DSP), a microprocessor, some combination thereof, and so forth. Media 1206 may be any available media that is included as part of and/or is accessible by device 1202. It includes volatile and non-volatile media, removable and non-removable media, storage (e.g., memory) and transmission media (e.g., wireless or wired communication channels), hardcoded logic media, combinations thereof, and so forth. Media 1206 is tangible media when it is embodied as a manufacture and/or as a composition of matter.

Interconnection 1214 interconnects the components of device 1202. Interconnection 1214 may be realized as a bus or other connection mechanism and may directly or indirectly interconnect various components. I/O interfaces 1208 may include (i) a network interface for monitoring and/or communicating across network 1216, (ii) a display device interface for displaying information on a display screen, (iii) one or more human-device interfaces, and so forth. Example network interfaces include, but are not limited to, a radio or transceiver (e.g., a transmitter and/or receiver), a modem, a network card, some combination thereof, and so forth. Human-device interface equipment 1212 may be a keyboard/keypad, a touch screen, a remote, a mouse or other graphical pointing device, a screen, a speaker, and so forth. Human-device interface equipment 1212 may be integrated with or discrete from device 1202

Generally, processor 1204 is capable of executing, performing, and/or otherwise effectuating processor-executable instructions, such as processor-executable instructions 1210. Media 1206 is comprised of one or more processor-accessible media. In other words, media 1206 may include processor-executable instructions 1210 that are executable by processor 1204 to effectuate the performance of functions by device 1202. Processor-executable instructions 1210 may be embodied as software, firmware, hardware, fixed logic circuitry, some combination thereof, and so forth. Processor 1204 and processor-executable instructions 1210 of media 1206 may be realized separately (e.g., as a DSP executing code) or integrated (e.g., as part of an application-specific integrated circuit (ASIC)).

In example implementations, one device 1202 may comprise a transmitting device 102, and another device 1202 may comprise a receiving device 104 (both of FIG. 1). Processor-executable instructions 1210 may comprise, for example, the components and/or units of FIGS. 3, 5, 7, 8, 10, and/or 11. When processor-executable instructions 1210 are executed by processor 1204, the functions that are described herein may be effectuated. Example functions include, but are not limited to, those illustrated by flow diagrams 400, 600, and 900 and those pertaining to features illustrated by the various procedures, schemes, and so forth.

Different embodiment(s) of the invention can offer one or more advantages. Generally, a nonparametric MIMO G-Rake receiver may determine an impairment covariance matrix without undue reliance on a strict model. More specifically, certain embodiments of nonparametric MIMO G-Rake receivers perform relatively well at low to moderate receiver speeds. Secondly, certain embodiments of nonparametric MIMO G-Rake receivers are relatively robust with respect to delay estimation errors. On the other hand, delay estimation errors can significantly impact the performance of other receivers. Although delay estimation errors can be otherwise mitigated, doing so entails a significant cost (e.g., in terms of complexity and memory) with such other receivers. A nonparametric G-Rake receiver formulation, in contrast, is robust to such errors.

The devices, acts, features, functions, methods, schemes, data structures, procedures, components, etc. of FIGS. 1-12 are illustrated in diagrams that are divided into multiple blocks and other elements. However, the order, interconnections, interrelationships, layout, etc. in which FIGS. 1-12 are described and/or shown are not intended to be construed as a limitation, and any number of the blocks and/or other elements may be modified, combined, rearranged, augmented, omitted, etc. in any manner to implement one or more systems, methods, devices, media, apparatuses, arrangements, etc. for nonparametric MIMO G-Rake receivers.

Although multiple embodiments of the present invention have been illustrated in the accompanying Drawings and described in the foregoing Detailed Description, it should be understood that the invention is not limited to the disclosed embodiments, for it is also capable of numerous rearrangements, modifications and substitutions without departing from the scope of the invention as set forth and defined by the following claims.

What is claimed is:

1. A method for a receiving device having a nonparametric G-Rake receiver, the method comprising acts of:
    calculating an impairment covariance matrix based on at least one pilot channel using a nonparametric mechanism in a multiple-input, multiple-output scenario in which at least one code-reuse interference term exists; and
    determining combining weights for the nonparametric G-Rake receiver responsive to the impairment covariance matrix and by accounting for the at least one code-reuse interference term.

2. The method as recited in claim 1, further comprising acts of:
    receiving a radio frequency signal;
    mixing the radio frequency signal down to a baseband signal;
    producing demodulated symbols from the baseband signal using the combining weights; and
    decoding the demodulated symbols to recover encoded information.

3. The method as recited in claim 1, wherein the at least one code-reuse interference term is a function of at least one effective net channel estimate and a per-code scaling factor.

4. The method as recited in claim 1, further comprising an act of:
    computing at least one net channel estimate using one or more pilot symbols of the at least one pilot channel;
    wherein the act of calculating the impairment covariance matrix comprises an act of calculating the impairment covariance matrix responsive to the at least one net channel estimate.

5. The method as recited in claim 1, wherein the act of calculating the impairment covariance matrix comprises acts of:
    computing a respective impairment covariance matrix for each of multiple respective transmit antennas; and
    summing the respective impairment covariance matrices to produce a total impairment covariance matrix;
    wherein the act of calculating the impairment covariance matrix comprises an act of calculating the total impairment covariance matrix.

6. The method as recited in claim 1, wherein the act of calculating the impairment covariance matrix comprises acts of:
    computing a respective impairment covariance matrix for each of multiple respective transmit antennas;
    summing the respective impairment covariance matrices to produce a total impairment covariance matrix; and
    smoothing the total impairment covariance matrix based on at least one previous impairment covariance matrix value to produce an overall impairment covariance matrix;
    wherein the act of calculating the impairment covariance matrix comprises an act of calculating the overall impairment covariance matrix.

7. The method as recited in claim 1, wherein the method implements a one-stage scheme to directly determine the combining weights.

8. The method as recited in claim 7, further comprising acts of:
computing at least one net channel estimate using one or more pilot symbols of the at least one pilot channel; and
computing at least one effective net channel estimate responsive to the at least one net channel estimate and a pre-coding vector;
wherein the act of calculating the impairment covariance matrix comprises an act of calculating the impairment covariance matrix responsive to the at least one net channel estimate; and
wherein the act of determining the combining weights comprises an act of determining the combining weights responsive to the at least one effective net channel estimate and the impairment covariance matrix.

9. The method as recited in claim 8, wherein the act of determining the combining weights further comprises an act of:
determining the combining weights responsive to at least one per-code scaling factor in a multiple stream mode to account for the at least one code-reuse interference term.

10. The method as recited in claim 1, wherein the method implements a two-stage scheme to determine the combining weights from intermediate combining weights.

11. The method as recited in claim 10, further comprising acts of:
computing at least one net channel estimate using one or more pilot symbols of the at least one pilot channel; and
computing at least one effective net channel estimate responsive to the at least one net channel estimate and a pre-coding vector;
wherein the act of calculating the impairment covariance matrix comprises an act of calculating the impairment covariance matrix responsive to the at least one net channel estimate; and
wherein the act of determining the combining weights comprises an act of computing the intermediate combining weights responsive to the at least one effective net channel estimate and the impairment covariance matrix.

12. The method as recited in claim 11, further comprising an act of:
using at least one of the intermediate combining weights for reporting a channel quality indicator, CQI.

13. The method as recited in claim 11, wherein the act of determining the combining weights further comprises an act of:
if the nonparametric G-Rake receiver is operating in a single stream situation, ascertaining the combining weights to be the intermediate combining weights.

14. The method as recited in claim 11, wherein the act of determining the combining weights further comprises an act of:
if the nonparametric G-Rake receiver is operating in a multiple stream situation, ascertaining the combining weights responsive to the intermediate combining weights and the at least one effective net channel estimate.

15. The method as recited in claim 14, wherein the act of ascertaining the combining weights comprises an act of:
ascertaining the combining weights based on at least one criteria, the at least one criteria selected from a group comprising: a zero forcing, ZF, criterion; a minimum mean squared error, MMSE, criterion; and a maximum likelihood, ML, criterion.

16. The method as recited in claim 15, further comprising an act of:
computing at least one per-code scaling factor;
wherein the act of ascertaining the combining weights further comprises an act of ascertaining the combining weights responsive to the at least one per-code scaling factor for the MMSE criterion or for the ML criterion.

17. A receiving device having a nonparametric G-Rake receiver, the receiving device comprising:
an impairment covariance matrix calculator to calculate an impairment covariance matrix based on at least one pilot channel using a nonparametric mechanism in a multiple-input, multiple-output scenario in which at least one code-reuse interference term exists; and
a combining weights determiner to determine combining weights for the nonparametric G-Rake receiver responsive to the impairment covariance matrix and by accounting for the at least one code-reuse interference term.

18. The receiving device as recited in claim 17, further comprising:
a radio receiver to receive a radio frequency signal;
a radio frequency unit to mix the radio frequency signal down to a baseband signal;
a symbol producer to produce demodulated symbols from the baseband signal using the combining weights; and
a decoder to decode the demodulated symbols to recover encoded information.

19. The receiving device as recited in claim 17, wherein the at least one code-reuse interference term is a function of at least one effective net channel estimate and a per-code scaling factor.

20. The receiving device as recited in claim 17, wherein the nonparametric G-Rake receiver is adapted to implement a one-stage scheme to directly determine the combining weights; and
wherein the receiving device further comprises:
a channel estimation unit to compute at least one net channel estimate using one or more pilot symbols of the at least one pilot channel; and
an effective channel estimation unit to compute at least one effective net channel estimate responsive to the at least one net channel estimate and a pre-coding vector;
wherein the impairment covariance matrix calculator is to calculate the impairment covariance matrix responsive to the at least one net channel estimate; and
wherein the combining weights determiner comprises a one-stage combining weights determiner that is to determine the combining weights responsive to the at least one effective net channel estimate and the impairment covariance matrix.

21. The receiving device as recited in claim 17, wherein the nonparametric G-Rake receiver is adapted to implement a two-stage scheme to determine the combining weights from intermediate combining weights; and
wherein the receiving device further comprises:
a channel estimation unit to compute at least one net channel estimate using one or more pilot symbols of the at least one pilot channel; and
an effective channel estimation unit to compute at least one effective net channel estimate responsive to the at least one net channel estimate and a pre-coding vector;
wherein the impairment covariance matrix calculator is to calculate the impairment covariance matrix responsive to the at least one net channel estimate; and
wherein the combining weights determiner comprises a two-stage combining weights determiner including an intermediate weights unit that is to compute the intermediate combining weights responsive to the at least one effective net channel estimate and the impairment covariance matrix.

22. The receiving device as recited in claim 21, wherein:
if the nonparametric G-Rake receiver is operating in a single stream mode, a single stream mode unit of the two-stage combining weights determiner is to ascertain the combining weights to be the intermediate combining weights.

23. The receiving device as recited in claim 21, wherein:
if the nonparametric G-Rake receiver is operating in a multiple stream mode, a multiple stream mode unit of the two-stage combining weights determiner is to ascertain the combining weights responsive to the intermediate combining weights and the at least one effective net channel estimate.

24. The receiving device as recited in claim 23, wherein the multiple stream mode unit is to ascertain the combining weights based on at least one criteria, the at least one criteria selected from a group comprising: a zero forcing, ZF, criterion; a minimum mean squared error, MMSE, criterion; and a maximum likelihood, ML, criterion.

25. The receiving device as recited in claim 17, wherein the receiving device comprises a remote terminal.

26. A microprocessor and non-transitory computer readable medium, the non-transitory computer readable medium storing processor-executable instructions for a nonparametric G-Rake receiver, wherein the processor-executable instructions, when executed by the microprocessor, direct a receiving device to perform acts comprising:
calculating an impairment covariance matrix based on at least one pilot channel using a nonparametric mechanism in a multiple-input, multiple-output scenario in which at least one code-reuse interference term exists; and
determining combining weights for the nonparametric G-Rake receiver responsive to the impairment covariance matrix and by accounting for the at least one code-reuse interference term.

* * * * *

UNITED STATES PATENT AND TRADEMARK OFFICE
CERTIFICATE OF CORRECTION

PATENT NO.         : 8,144,749 B2
APPLICATION NO.    : 12/198973
DATED              : March 27, 2012
INVENTOR(S)        : Cairns et al.

Page 1 of 1

It is certified that error appears in the above-identified patent and that said Letters Patent is hereby corrected as shown below:

On the Title Page, in Field (73), under "Assignee", in Column 1, Line 1, delete "Ericsson," and insert -- Ericsson (Publ), --, therefor.

In Column 3, Line 30, delete "$\gamma_s(k)$" and insert -- $\gamma_x(k)$ --, therefor.

In Column 3, Line 36, delete "WCDM," and insert -- WCDMA, --, therefor.

In Column 4, Line 66, in Equation (7), delete "$h^{i,j}_{N_s,-1,0}$" and insert -- $h^{i,j}_{N_s-1,0}$ --, therefor.

In Column 5, Line 4, delete "$(2N_s,F)$" and insert -- $(2N_sF)$ --, therefor.

In Column 13, Line 50, in Equation (12), delete "$$\hat{R}^{measured}_{u,A} = \frac{1}{J-1} \sum_{k=0}^{J-1} (x_p(k)s^*_A(k) - h_A)(x_p(k)s^*_A(k) - \hat{h}_A)^H,$$" and insert -- $$\hat{R}^{measured}_{u,A} = \frac{1}{J-1} \sum_{k=0}^{J-1} (x_p(k)s^*_A(k) - \hat{h}_A)(x_p(k)s^*_A(k) - \hat{h}_A)^H,$$ --, therefor.

In Column 16, Line 18, delete "$\hat{R}^{measured}_{u}$" and insert -- $\hat{R}^{measured}_{u,A}$ --, therefor.

In Column 16, Line 35, delete "$w_1$," and insert -- $w_1$ --, therefor.

Signed and Sealed this
Twenty-sixth Day of June, 2012

David J. Kappos
*Director of the United States Patent and Trademark Office*